(12) United States Patent
Watanabe et al.

(10) Patent No.: US 6,246,393 B1
(45) Date of Patent: Jun. 12, 2001

(54) COORDINATE READING APPARATUS AND COORDINATE INDICATOR

(75) Inventors: Toshiaki Watanabe; Yoshiyuki Morita, both of Chiba (JP)

(73) Assignee: Seiko Instruments Information Devices Inc. (JP)

( * ) Notice: Subject to any disclaimer, the term of this patent is extended or adjusted under 35 U.S.C. 154(b) by 0 days.

(21) Appl. No.: 09/016,453

(22) Filed: Jan. 30, 1998

(30) Foreign Application Priority Data

Jan. 30, 1997 (JP) .................................................. 9-019472

(51) Int. Cl.[7] ...................................................... G09G 5/00
(52) U.S. Cl. ...................... 345/173; 345/179; 178/18.01; 178/19.03
(58) Field of Search .................................. 345/173, 179; 178/18.01–18.07, 19.03, 19.06

(56) References Cited

U.S. PATENT DOCUMENTS

| | | | | |
|---|---|---|---|---|
| 4,686,516 | * | 8/1987 | Humphrey | 340/572 |
| 5,220,324 | * | 6/1993 | Morita | 341/32 |
| 5,650,236 | * | 7/1997 | Hirano et al. | 428/611 |
| 5,801,630 | * | 9/1998 | Ho et al. | 340/572 |
| 5,854,881 | * | 12/1998 | Yoshida et al. | 345/104 |

FOREIGN PATENT DOCUMENTS

| | | |
|---|---|---|
| 388860A2 | 9/1990 | (EP) . |
| 388860A3 | 9/1990 | (EP) . |

OTHER PUBLICATIONS

IEEE Translation Journal on Magnetics in Japan, vol. 7, No. 8, Aug. 1, 1992, pp. 654–664, K. Mohri, "Sensormagnetics".

* cited by examiner

*Primary Examiner*—Amare Mengistu
*Assistant Examiner*—Jimmy H. Nguyen
(74) *Attorney, Agent, or Firm*—Adams & Wilks

(57) ABSTRACT

A wireless type coordinate reading apparatus, in which a coordinate value of a position indicated by a coordinate indicator can be calculated in high resolution, the coordinate indicator can be made simple, and further widths of a pen shaft and a pen tip can be narrowed is disclosed. A coordinate reading apparatus is constituted by AC magnetic field generating means for generating an AC magnetic field; a coordinate indicator having a magnetic material for producing a magnetic pulse caused by the Large Barkhausen effect when the magnetic material is positioned in the magnetic field generated from the AC magnetic field generating means; magnetic field detecting means for detecting the magnetic pulse caused by the Large Barkhausen effect; and coordinate calculating means connected to the magnetic field detecting means, for calculating a position indicated by the coordinate indicator in response to a signal produced based upon the magnetic pulse detected by the magnetic field detecting means.

27 Claims, 18 Drawing Sheets

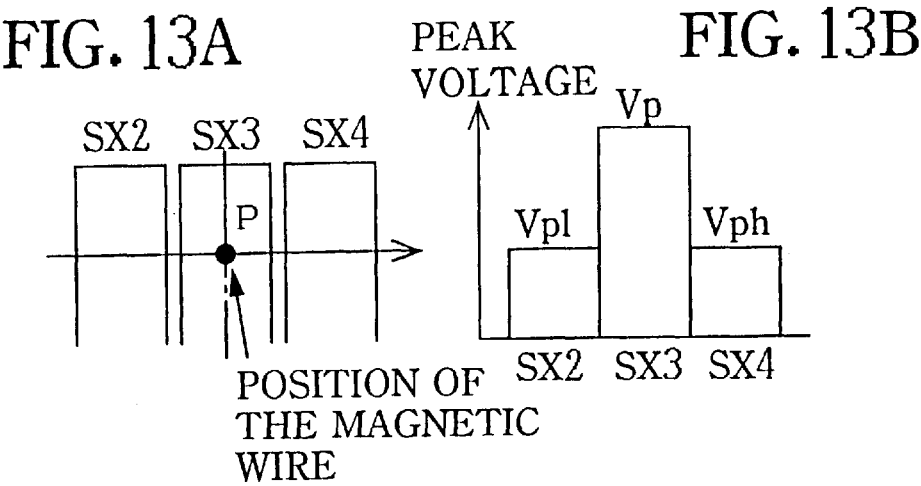
FIG. 13A / FIG. 13B
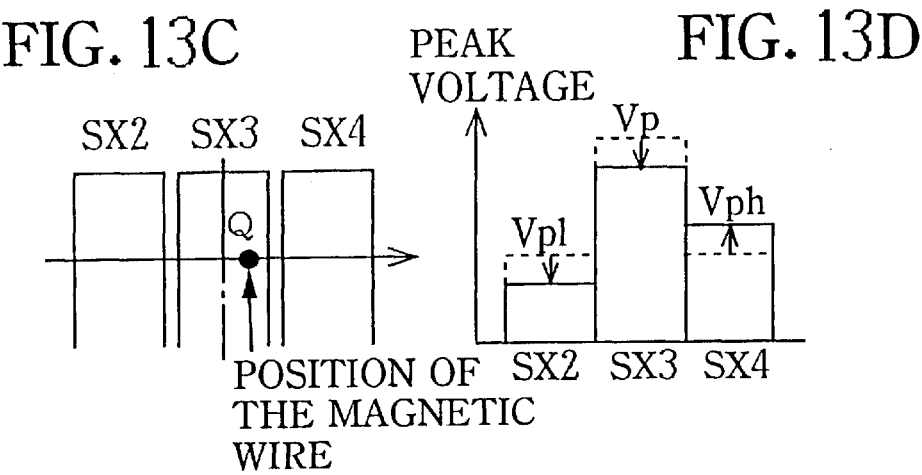
FIG. 13C / FIG. 13D
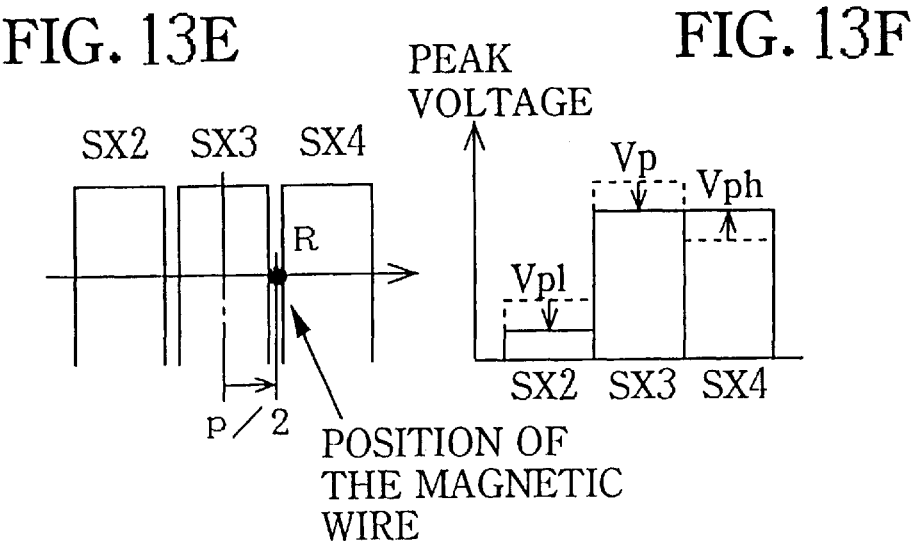
FIG. 13E / FIG. 13F

COORDINATE READING APPARATUS AND COORDINATE INDICATOR

BACKGROUND OF THE INVENTION

1. Field of the Invention

The present invention is related to a coordinate reading apparatus and a coordinate indicator, in which a coordinate value of a desirable position on a tablet, indicated by the coordinate indicator, is calculated, and the calculated coordinate value is output.

2. Description of the Related Art

As a conventional coordinate reading apparatus, Japanese Laid-open Patent Application No. 2-249019 opened in 1990 describes a coordinate reading apparatus for calculating the coordinate value of a position indicated by a coordinate indicator, in which a resonant circuit is provided in the coordinate indicator, an AC magnetic field having a frequency nearly equal to the resonant frequency of the resonant circuit is applied from the tablet to the coordinate indicator, the signal reflected from the resonant circuit is received by the tablet, and thus the coordinate value of the indicated position is calculated in response to the received signal.

On the other hand, U.S. Pat. No. 5,532,598 discloses "AMORPHOUS METAL TAGGING SYSTEM FOR UNDERGROUND STRUCTURES INCLUDING ELONGATED PARTICLES OF AMORPHOUS METAL EMBEDDED IN NONMAGNETIC AND NONCONDUCTIVE MATERIAL" to Clark, Jr. et al. In this amorphous metal tagging system, the amorphous metal tag is attached to the object under examination, and this metal tag produces a reaction caused by the Barkhausen effect when the metal tag is located in the magnetic field. The circuit for generating the magnetic field, and also the circuit for detecting the reaction caused by the Barkhausen effect are provided in the detecting circuit. Then, existence of the object under examination is detected from the remote position.

For the sake of easy understanding of this metal tagging system, the abstract of U.S. Pat. No. 5,532,598 will now be described as follows:

An electromagnetic tagging system is provided for remotely detecting and locating polymeric and other non-conductive structures situated behind barriers, such as underground plastic pipes or containers. The system comprises a fluctuating magnetic field source, a pattern of tags embedded in discrete regions of the wall of the polymeric structure, each tag including an amorphous magnetic metal target for generating a Barkhausen response when exposed to the fluctuating magnetic field source, and a portable detection circuit movable along the ground or other control surface for remotely detecting the Barkhausen response. The amorphous magnetic material in each tag is preferably in the form of a plurality of elongated particles having aspect ratios of at least 3 to 1 and arranged end-to-end. The pattern that the tags are arranged in provide information concerning the identity, orientation, or extent of the structure, and the portable detection circuit is capable of detecting at least two of the tags simultaneously as it is moved over the surface of the ground so that the patterns of the tags may be easily determined.

The Barkhausen effect, or the Barkhausen response conducted in this metal tagging system will result in the below-mentioned phenomenon.

In the case that a ferromagnetic material has a uniform crystal structure, this ferromagnetic material has a linear magnetizing characteristic with respect to a continuous change in field strength of an external magnetic field. This is caused by the fact that when a magnetizing direction of internal magnetic domains and a magnitude of the internal magnetic domains are changed by the application of the external magnetic field, a magnetic domain wall which constitutes each of the magnetic domains can be freely moved in response to the field strength of the external magnetic field.

To the contrary, in such a case that a crystal structure of a ferromagnetic material is not uniform, or this ferromagnetic material has a portion whose magnetizing characteristics are partially different in response to the applied stress, the following phenomenon will occur. That is, the movement of the magnetic domain wall is disturbed in a discontinuous portion of the crystal structure. In this case, the magnetic domain wall is retained at this place until sufficient energy is given to this magnetic domain wall by the external magnetic field, and is rapidly moved to another place when sufficient energy is applied by which the magnetic domain wall comes out from this retained place. The Barkhausen effect imparts such a rapid magnetizing jumping phenomenon occurred in a ferromagnetic material having a magnetically unequal structure.

A ferromagnetic material with the Barkhausen effect represents a specific non-linear magnetizing characteristic. As a result, this ferromagnetic material may be used as such a functional element for generating a higher harmonic wave pulse field in response to the continuous change in the field strength of the external magnetic field. The Barkhausen response represents the higher harmonic wave pulse field produced by the magnetic material having the Barkhausen effect in this specification.

Also, there is a so-called "Large Barkhausen effect" phenomenon similar to the Barkhausen effect. The present invention is directed to an apparatus for using this Large Barkhausen effect. This Large Barkhausen effect will be explained more in detail later.

As previously described in the field of the coordinate reading apparatus, such a coordinate reading apparatus is known. That is, the coordinate value is calculated in response to the signal produced by coupling the tablet to the coordinate indicator by the resonant circuit. As to the field of detecting the presence of an article, the following apparatus is known. That is, the signal generated based on the Barkhausen effect is detected, and then the article is detected from the remote position.

However, in the above-described conventional coordinate reading apparatus, since a coil must be provided in the coordinate indicator, in the case that a stylus pen corresponding to a pen-shaped coordinate indicator is constituted, the pen tip cannot be made narrow. This is because the coil is required to be arranged in the pen tip. As a result, there is a problem in that the stylus pen cannot be easily utilized as a writing tool.

Although a passive type resonant circuit may be constructed, the coil and the capacitor should be electronically connected on the printed circuit board. There is another problem in that the resultant structure becomes complex. As a consequence, there is a further problem in that the width of the pen shaft cannot be narrowed.

In the above-described metal tagging system, the elongated amorphous metal is merely provided on the object under examination, so that the structure of the object under detection can be made simple. However, since this metal tagging system has not been constituted as a coordinate reading apparatus, there is the further problem that the precise position of the object under detection cannot be calculated. The coordinate reading apparatus is required to calculate the coordinate value of the position indicated by the coordinate indicator at a high resolution.

SUMMARY OF THE INVENTION

An object of the present invention is to provide a wireless coordinate reading apparatus in which a coordinate indicator is no longer connected to a tablet by a signal line, that is capable of calculating a coordinate value of a position indicated by a coordinate indicator at a high resolution. Moreover, another object of the present invention is to provide such an easy to operate coordinate reading apparatus whose coordinate indicator can be made simple, and the pen shaft, or the pen tip of which can be made narrow.

To achieve the above-described objects, a coordinate reading apparatus, according to a first aspect of the present invention, is featured by comprising: AC magnetic field generating means for generating an AC magnetic field; a coordinate indicator having a magnetic material for producing a magnetic pulse caused by the Large Barkhausen effect when the magnetic material is positioned in the magnetic field generated from the AC magnetic field generating means; magnetic field detecting means for detecting the magnetic pulse caused by the Large Barkhausen effect; and coordinate calculating means connected to the magnetic field detecting means, for calculating a position indicated by the coordinate indicator in response to a signal produced based upon the magnetic pulse detected by the magnetic field detecting means.

BRIEF DESCRIPTION OF THE DRAWINGS

For a more better understanding of the present invention, reference is made of a detailed description to be read in conjunction with the accompanying drawings, in which:

FIG. 13 is an explanatory diagram for describing a relationship between a peak voltage and a position of a magnetic wire in the fourth embodiment;

DETAILED DESCRIPTION OF THE PREFERRED EMBODIMENTS (First Embodiment)

Referring now to the attached drawings, an embodiment mode of the present invention will be described in detail.

Figure 1:
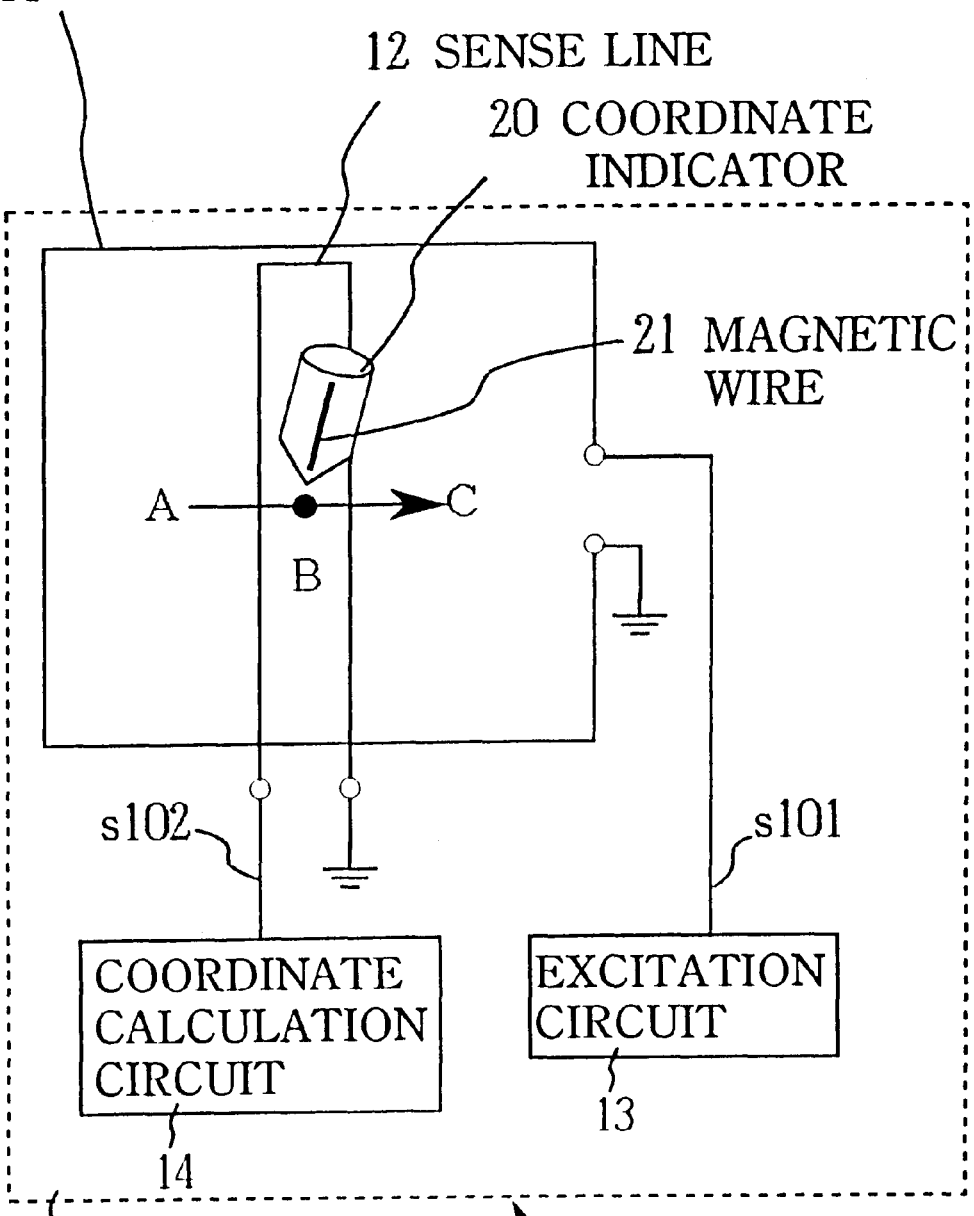
FIG. 1 is a schematic block diagram for indicating an arrangement of a coordinate reading apparatus according to a first embodiment of the present invention.

FIG. 1 is a schematic block diagram for showing a coordinate reading apparatus according to a first embodiment of the present invention. The coordinate reading apparatus 1 is constructed of a tablet 10 and a coordinate indicator 20. An excitation line 11 and a sense line 12 are arranged on a coordinate reading plane of the tablet 10. The excitation line 11 is a coil arranged in a rectangular shape in order to widely surround the coordinate reading plane. Also, the sense line 12 is a coil arranged in a rectangular shape, inside the excitation line 11. Although FIG. 1 illustrates that the coils are made of 1-turn loops, the coils may be made of plural-turn loops so as to emphasize the magnetic coupling between these coils.

An excitation circuit 13 is connected to the excitation line 11. This excitation circuit 13 supplies an AC excitation signal s101 to the excitation line 11, and both an oscillator and a drive circuit (both are not shown) are built in the excitation circuit 13.

Figure 2:
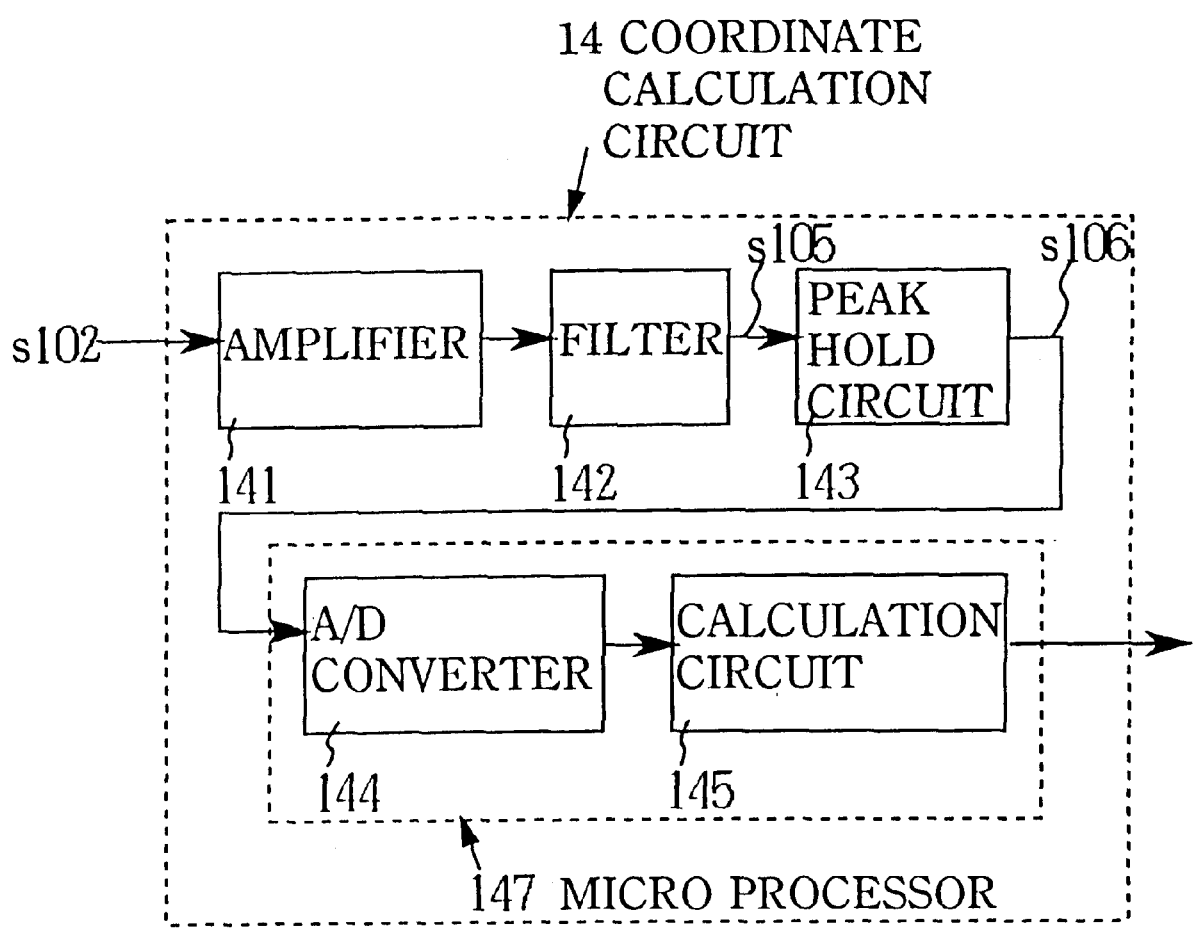
FIG. 2 is a schematic block diagram of the coordinate calculation circuit employed in the coordinate reading apparatus of the first embodiment.

A coordinate calculation circuit 14 is connected to the sense line 12. A detailed circuit arrangement of this coordinate calculation circuit 14 is shown in FIG. 2. An amplifier circuit 141 is connected to the sense line 12 so as to amplify an induced signal s102 induced to the sense line 12 in such a manner that the signal level of the amplified induction signal is equal to a signal level required to operate the post-staged circuit. An output of the amplifier circuit 141 is coupled to a filter circuit 142. This filter circuit 142 removes the component of the excitation signal from the amplified induction signal, so that only a signal component s105 induced by coupling the coordinate indicator 20 to the sense line 12 can pass through this filter circuit 142. A detailed filtering operation of this filter circuit 142 will be explained later. An output of the filter circuit 142 is connected to a peak hold circuit 143. The peak hold circuit 143 is a circuit for holding a peak of an AC signal passed through the filter circuit 142 for a predetermined time period. An output of the peak hold circuit 143 is connected to an A/D converter 144. The A/D converter 144 converts the inputted peak value into a digital value. An output of the A/D converter 144 is connected to a calculation circuit 145. The calculation circuit 145 calculates a coordinate value of an indicated position of the coordinate indicator based on the digitally converted peak value. In this embodiment, both A/D converter 144 and the calculation circuit 145 may be realized by a one-chip microprocessor 147.

The coordinate indicator 20 indicates a position of a coordinate value to be read, and contains therein a magnetic wire 21. This magnetic wire 21 may cause the Large Barkhausen effect, and is known as, for instance, a Wiegand wire.

The Large Barkhausen effect and the Wiegand wire will now be summarized.

That is, when a ferromagnetic alloy formed in a ribbon shape, or a wire is properly treated, such a magnetic condition can be provided in which the coercive force of the outer shell portion of the material is different from the coercive force of the center portion. In such a ferromagnetic alloy, an elongate magnetic domain wall is formed between the outer shell portion and the center portion along the axial direction.

When an external magnetic field is gradually applied to this material along the axial direction, the following phenomenon occurs. That is, the magnetic domain wall happens to move at a certain magnetic field strength, and uniforming of magnetic domains is transferred over the entire length of the material at a high speed. Observing this phenomenon from the outer field, the magnetizing direction of the outer shell portion is suddenly inverted when the field strength of the external magnetic field becomes a certain field strength. The Large Barkhausen effect imparts a sudden jumping phenomenon along the magnetizing direction, which may appear in the ferromagnetic alloy formed in a specific shape.

The material formed in the above-described manner represents the magnetic bi-stable characteristic, and will produce the higher harmonic wave pulsatory magnetic field in response to the alternate external magnetic field having the field strength higher than such a field strength at which the movement of the magnetic domain wall may occur.

A Wiegand wire corresponds to one example of the ferromagnetic alloy wires made with the application of this Large Barkhausen effect. Either Permalloy (Fe—Ni) or Vacalloy (Fe—Co—V) is processed as a line having a diameter of on the order of 0.3 mm. This wire is heat-processed by applying tension and twist forces, and distortion of the twist force is fixed to the wire. When the above-described treatment is carried out, there is a difference between the residual stress of the wire outer shell portion and the residual stress of the wire center portion, and also such a condition is established that the coercive force of the outer shell portion is different from the coercive force of the center portion, so that the magnetic domain wall along the longitudinal direction is constituted.

This wire is disclosed as the bi-stable magnetic element in Japanese Patent Publication No. 55-15797 published in 1980, and U.S. Pat. No. 3,820,090.

In accordance with the coordinate indicator 20, the above-described magnetic wire 21 is arranged inside a pen-shaped case along the axial direction.

Figure 3:
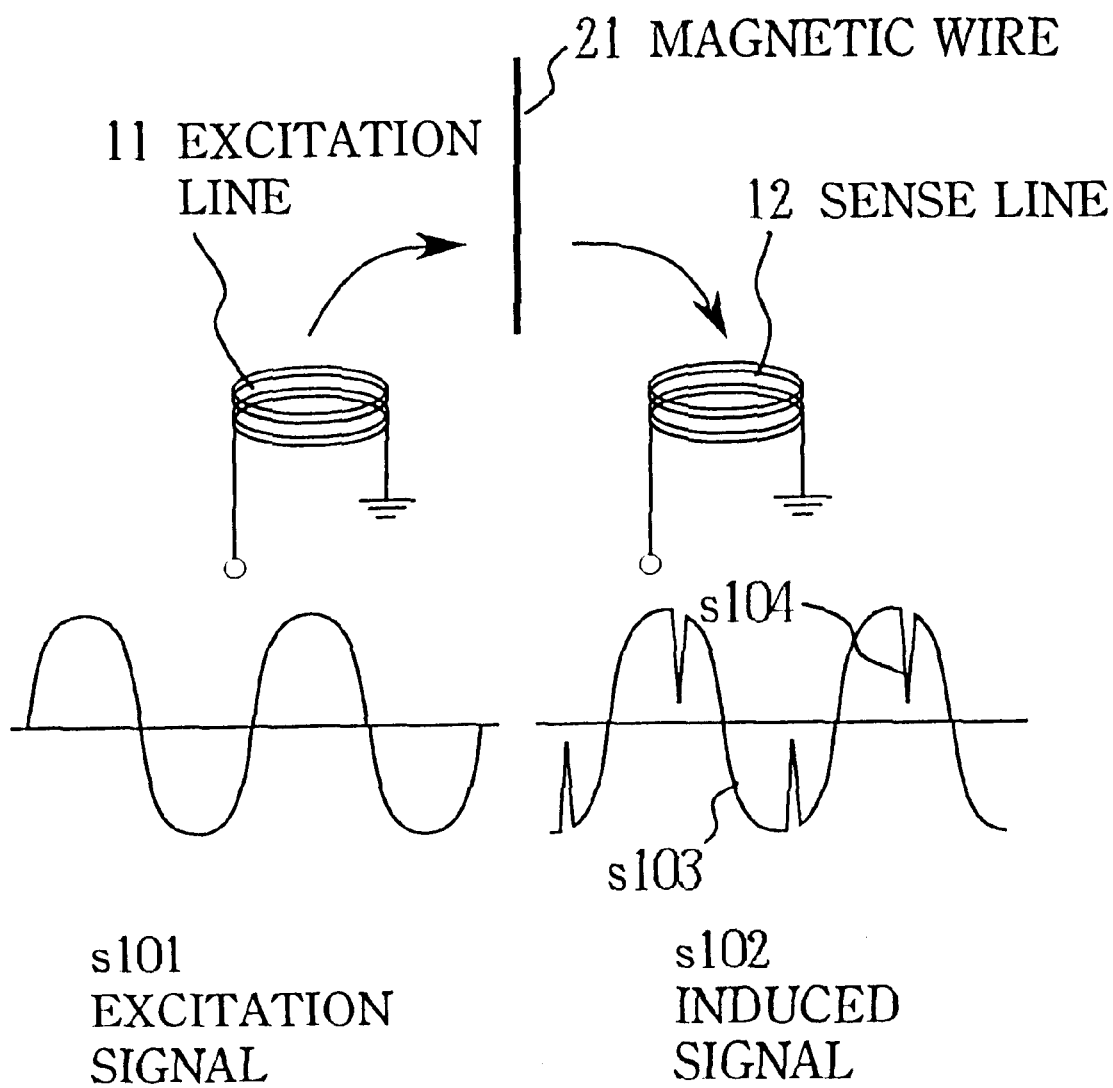
FIG. 3 is an explanatory diagram for explaining the basic idea of the coordinate calculation in accordance with the first embodiment of the present invention.

In the coordinate reading apparatus with the above-described arrangement, the coordinate value of the position indicated by the coordinate indicator 20 may be calculated as follows. FIG. 3 is an explanatory diagram for representing a basic idea of the coordinate calculation. In this drawing, an excitation line 11, a sense line 12, and a magnetic wire 21 are identical to those shown in FIG. 1. It should be noted that both the excitation line 11 and the sense line 12 are indicated as coils.

When the AC excitation signal s101 is supplied to the excitation line 11 from the excitation circuit 13, an AC magnetic field is generated by the excitation line 11. Since the excitation line 11 and the sense line 12 are arranged as shown in FIG. 1, the AC magnetic field generated by the excitation line 11 is coupled to the sense line 12, and an induced signal s103 having the same frequency component as that of the excitation signal s101 is induced. In this case, when the magnetic wire 21 is positioned in the AC magnetic field and is exposed to a magnetic field having a field strength higher than a preselected level, the magnetic wire 21 may produce a magnetic pulse based on the Large Barkhausen effect. Then, this magnetic pulse is induced as a pulsatory induced signal s104 to the sense line 12. The induced signal s102 induced to the sense line 12 constitutes a signal made by adding the signal component s103 directly coupled with the excitation signal s101 to the signal component s104 caused by the Large Barkhausen effect.

In this case, the magnitude of the signal component s103 directly coupled with the excitation signal s101 is continuously constant because the positional relationship between the excitation line 11 and the sense line 12 is constant. However, the magnitude of the peak of the signal component s104 by the Large Barkhausen effect is varied, depending upon the distances among the excitation line 11, the sense line 12, and the magnetic wire 21. If the magnitude of the magnetism received by the magnetic wire 21 from the excitation line 11 becomes constant, then the magnitude of the peak of the signal component s104 caused by the Large Barkhausen effect is changed only by the distance between the sense line 12 and the magnetic wire 21. The coordinate reading apparatus according to the present invention may calculate the coordinate value based upon the above-explained basic idea.

Figure 4:
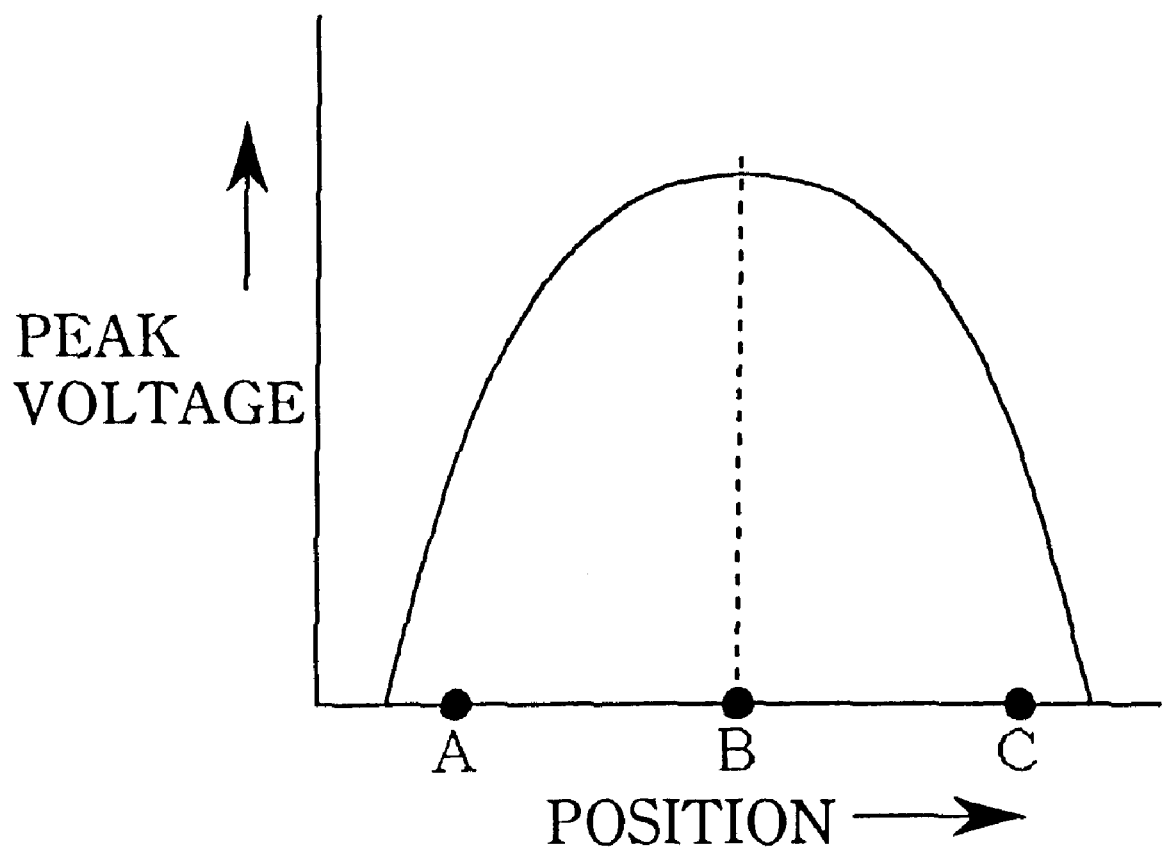
FIG. 4 is an explanatory diagram for explaining one example of a variation in peak voltages based on the Large Barkhausen effect with respect to the positions of the coordinate indicator according to the first embodiment.

In the case that the excitation line 11 and the sense line 12 are arranged as indicated in FIG. 1, the following assumption can be established. That is, the magnitudes of the magnetic field are approximately constant in the vicinity of the location of the sense line 12. As a result, the magnitude of the peak of the induced signal based on the Large Barkhausen effect of the induced signal s102 induced to the sense line 12 is varied only by the distance measured between the sense line 12 and the coordinate indicator 20. When the coordinate indicator 20 is moved as shown in this drawing along a direction perpendicular to the longitudinal direction of the sense line 12, namely along a straight line A-B-C, the magnitudes of the peaks of the induced signals caused by the Large Barkhausen effect are small at the points A and C, and are maximum at the point B. FIG. 4 graphically represents an example of a change in the peak values of the induced signals caused by the Large Barkhausen effect. An ordinate of FIG. 4 indicates the peak voltage, and the abscissa thereof represents the positions indicated by the coordinate indicator 20 of FIG. 1. Symbols A, B, C correspond to the positions A, B, C shown in FIG. 1.

Figure 5A:
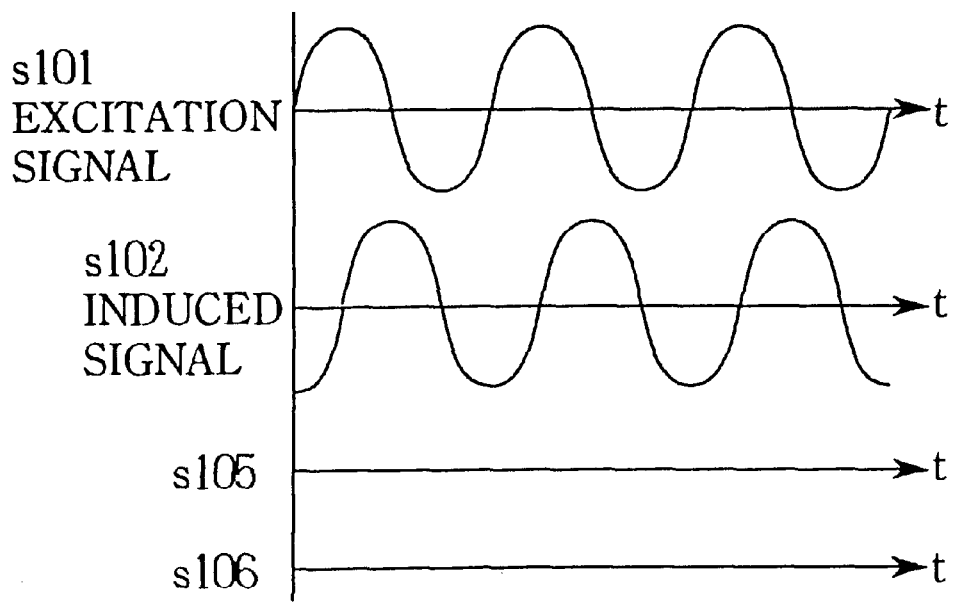
FIG. 5 is a timing chart for representing signals appearing in various circuit portions of the first embodiment.
Figure 5B:
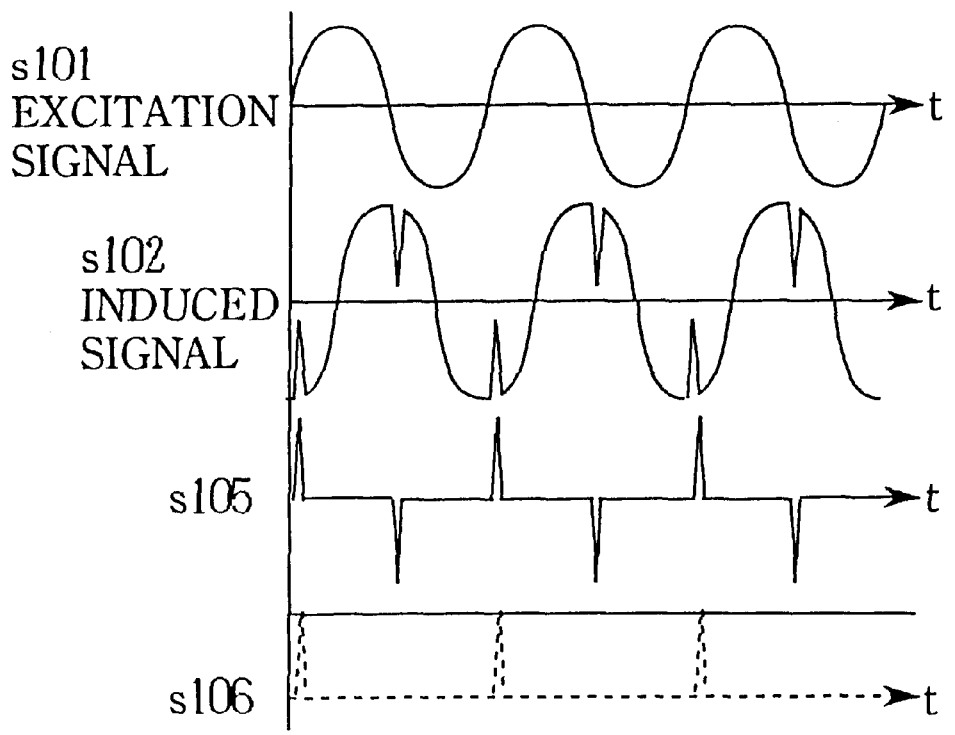

Referring now to a timing chart shown in FIGS. 5A and 5B, operations of the coordinate reading apparatus 1 and the coordinate indicator 20 of this first embodiment will be explained. The excitation circuit 13 supplies the excitation signal s101 to the excitation line 11, and thus this excitation line 11 generates the AC magnetic field. The induced signal s102 is induced to the sense line 12 by magnetically coupling this AC magnetic field to this sense line 12. In this case, when the coordinate indicator 20 is not located in the vicinity of the tablet 10, no magnetic coupling by the magnetic wire 21 is produced. As a result, as represented in FIG. 5A, the induced signal s102 will constitute only the AC signal having the same frequency component as that of the excitation signal s101. The filter circuit 142 corresponds to a circuit having such a characteristic capable of separating the frequency component of the excitation signal s101 from the frequency component of the signal caused by the Large Barkhausen effect, and also capable of causing only the latter frequency component to pass through this filter. Accordingly, in this case, an output signal s105 of the filter circuit 142 becomes substantially zero, and similarly a signal s106 outputted from the peak hold circuit 143 for holding this filter output signal becomes substantially zero.

To the contrary, when the coordinate indicator 20 is positioned in the vicinity of the excitation line 11 and then the magnetic field having the field strength higher than a predetermined level is applied to the magnetic wire 21, this magnetic wire 21 generates the magnetic pulse caused by the Large Barkhausen effect. This magnetic pulse is produced as a pulsatory signal when the polarity of the AC magnetic field is inverted, as indicated in FIG. 5B, assuming now that this magnetic pulse is indicated by the induced signal s102 induced to the sense line 12. As a consequence, the induced signal s102 becomes such a signal that a higher harmonic wave signal is superimposed on a sinusoidal wave (sine wave) having the same frequency as that of the excitation signal s101. The filter circuit 142 separates this sinusoidal wave component from the higher harmonic wave component, and causes only this higher harmonic wave component to pass through this filter. An output signal of this circuit is indicated as s105 in FIG. 5B. The peak hold circuit 143 holds the peak of the output signal s105 from the filter circuit 142, and produces a DC signal s106 maintained for a predetermined time period. The DC signal s106 of FIG. 5B indicates this peak holding condition.

As previously explained, in FIG. 1, when the coordinate indicator 20 is moved from the point A to the point C, the magnitude of the peak voltage of the induced signal caused by the Large Barkhausen effect is represented in the graphic representation of FIG. 4. That is, as indicated in FIG. 4, the magnitude of the peak is increased from the point A to the point B, and is decreased from the point B to the point C. Thus, a symmetrical-shaped peak change is obtained while the point B corresponding to the center of the sense line 12 becomes maximum. While preparing such a table that the magnitudes of the peak voltages are defined in correspondence with the positions along the coordinate axis by setting the straight line A-B-C to the direction of the one-dimensional coordinate axis used to calculate the coordinate values, the calculation circuit 145 can calculate the position of the coordinate indicator 20 with reference to this table based on such a digital signal value produced by A/D-converting the peak-held signal s106 by the A/D converter circuit 144.

It should also be understood that several practical problems may be provided in this first embodiment since the basic idea for calculating the coordinate value is merely explained. For instance, it is not possible to discriminate the position of the point A from the position of the point C. Also, there is another problem that when the coordinate indicator 20 is moved on the tablet 10 along the height direction, the calculated coordinate value is varied. However, if the following restriction is made, then the one-dimensional coordinate values can be calculated, as previously described. That is, the position of the coordinate indicator 20 is limited only to one side, for instance, the region of the line segment A-B, and the height of this coordinate indicator 20 is limited to a constant height.

(Second Embodiment)

Figure 6:
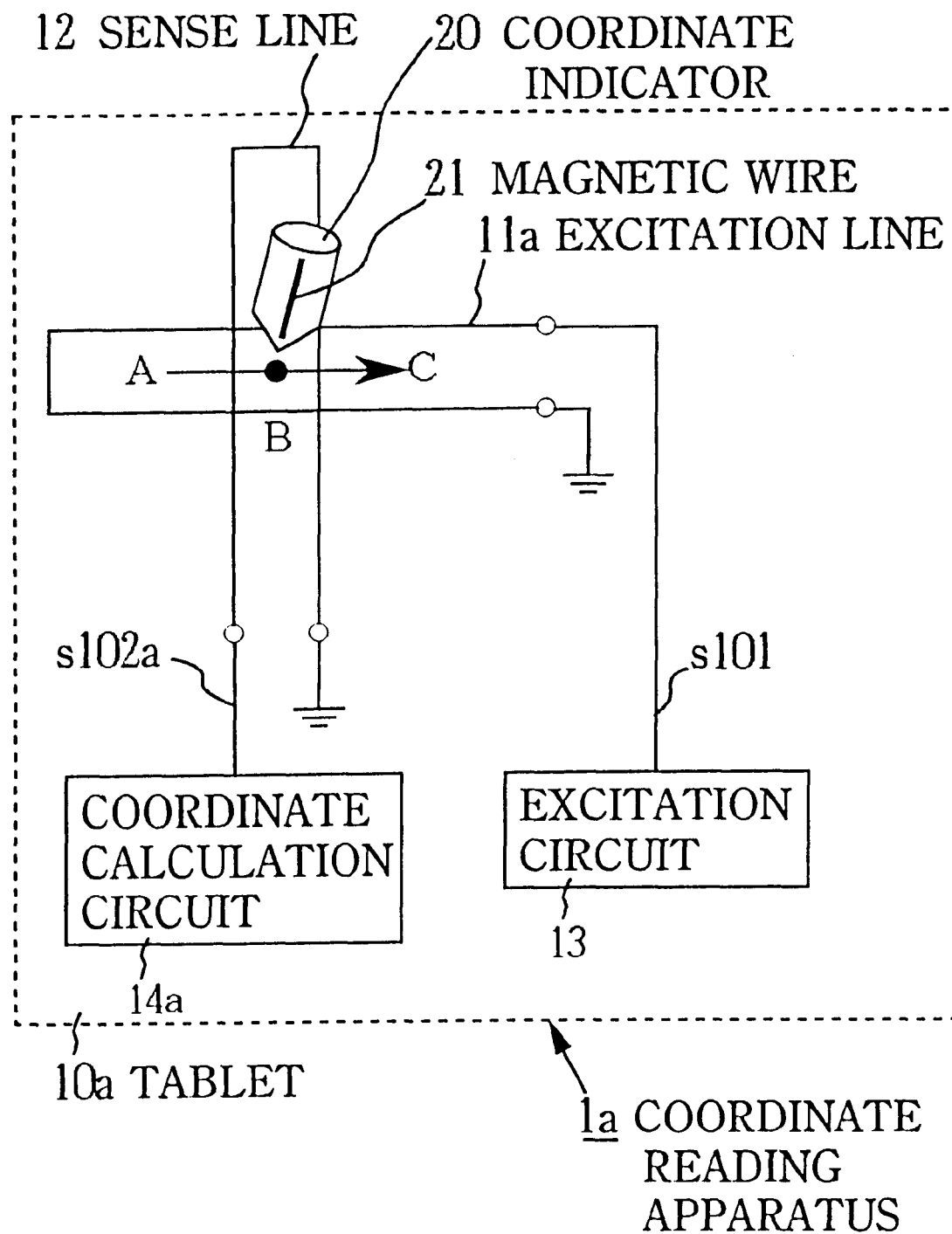
FIG. 6 is a schematic block diagram for indicating an arrangement of a coordinate reading apparatus according to a second embodiment of the present invention.
Figure 7:
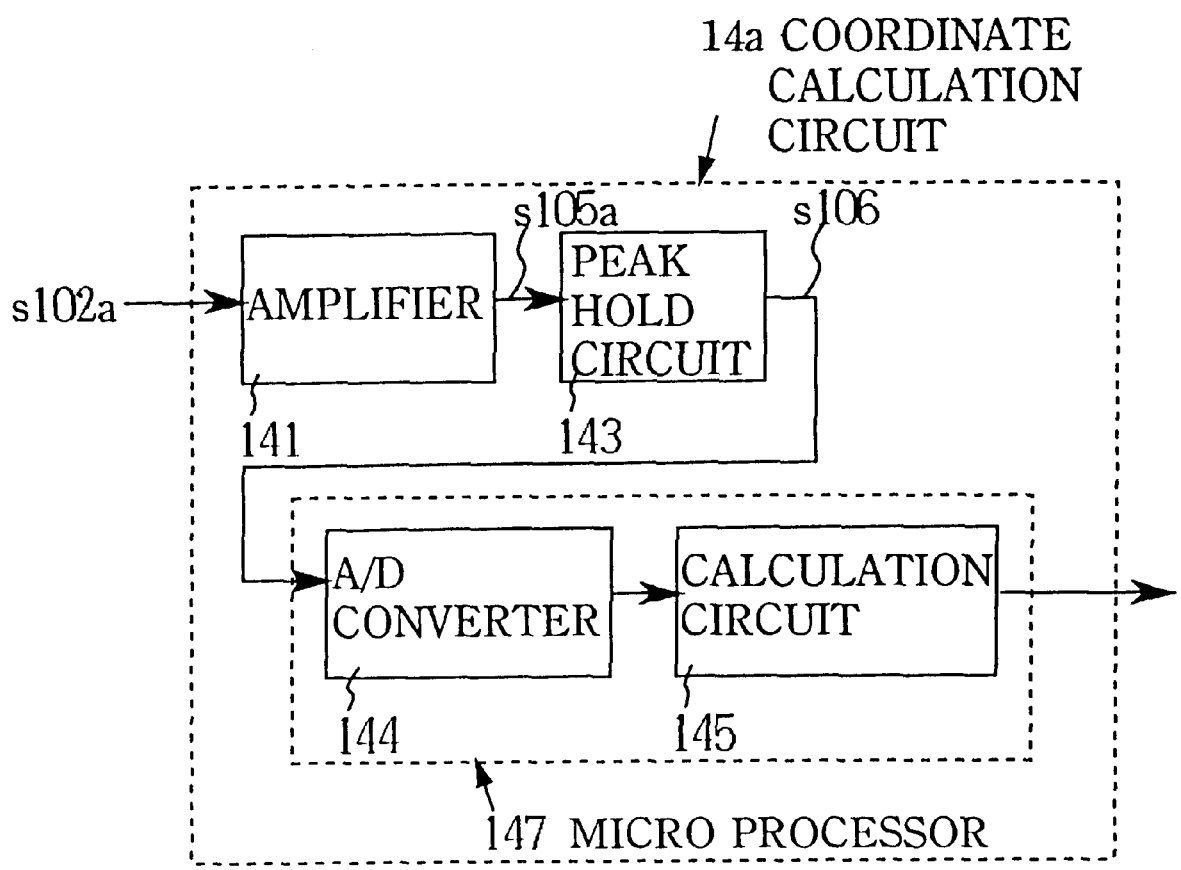
FIG. 7 is a schematic block diagram of the coordinate calculation circuit employed in the coordinate reading apparatus of the second embodiment.
Figure 8:
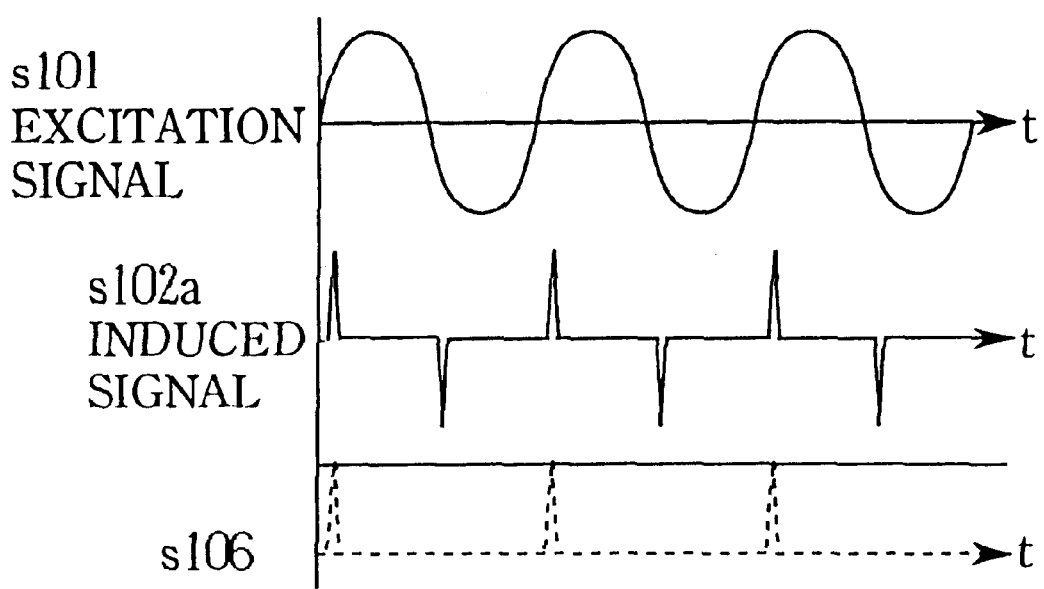
FIG. 8 is a timing chart for representing signals appearing in various circuit portions of the second embodiment.

Referring now to FIG. 6 to FIG. 8, a description will be made of a coordinate reading apparatus 1a in which a rectangular-shaped excitation line is arranged perpendicular to a sense line, according to a second embodiment of the present invention.

FIG. 6 is a schematic block diagram of the coordinate reading apparatus 1a according to this second embodiment. As indicated in this drawing, similar to the sense line 12, an excitation line 11a is made of a rectangular-shaped coil. This rectangular-shaped excitation line 11a is arranged in such a manner that an axis of this excitation line 11a along the longitudinal direction thereof is intersected with an axis of the sense line 12 along the longitudinal direction thereof at a right angle. The excitation circuit 13 supplies the excitation signal s101 to this excitation line 11a, similar to the above-described first embodiment.

Although the sense line 12 is the same as that of the first embodiment, a coordinate calculation circuit 14a connected to this sense line 12 is arranged as in FIG. 7, a portion of which is different from the first embodiment. As seen from this drawing, the filter circuit 142 employed in the first embodiment is deleted, and the output of the amplifier circuit 141 is connected to the peak hold circuit 143. Other circuits except for the filter circuit are identical to those of the first embodiment.

Next, operations of the second embodiment will now be described with reference to a timing chart shown in FIG. 8. In accordance with this second embodiment, since the excitation line 11a is arranged perpendicular to the sense line 12, in such a case that the coordinate indicator 20 is not located in the vicinity of a tablet 10a, no induced signal s102a is produced.

To the contrary, when the coordinate indicator 20 is set close to the intersecting region between the excitation line 11a and the sense line 12, and then the magnetic field having the field strength higher than a preselected level is applied to the magnetic wire 21, the magnetic wire 21 produces a magnetic pulse caused by the Large Barkhausen effect. Then, this magnetic pulse will be coupled with the sense line 12 to produce the induced signal s102a. Different from the induced signal of the first embodiment, as indicated in FIG. 8, this induced signal s102a contains only the signal component caused by the Large Barkhausen effect.

As a consequence, if the signal level of the induced signal s102a is amplified by the amplifier circuit 141 up to a necessary signal level, then only the signal component s105a caused by the Large Barkhausen effect can be acquired without separating the signals by the filter circuit. Similar to the first embodiment, a signal s106 made by holding a peak of this signal s105a represents a positional relationship between the coordinate indicator 20 and the sense line 12. A straight line A-B-C shown in FIG. 6 implies a one-dimensional coordinate axis provided in the vicinity of a center line of the excitation line 11a along the longitudinal direction. When the coordinate indicator 20 is moved along this one-dimensional coordinate axis, the magnitude of the peak of the induced signal represents the same trend as shown in FIG. 4. As a consequence, similar to the first embodiment, the coordinate reading apparatus 1a of the second embodiment can calculate the position of the coordinate indicator 20 with reference to a table for describing the trend of FIG. 4 based upon the digitalized signal s106 with holding the peak thereof.

(Third Embodiment)

Referring now to a schematic block diagram of FIG. 9, a description will be made of another coordinate reading apparatus 1b in which an excitation line and a sense line are commonly used in accordance with a third embodiment of the present invention.

Figure 9:
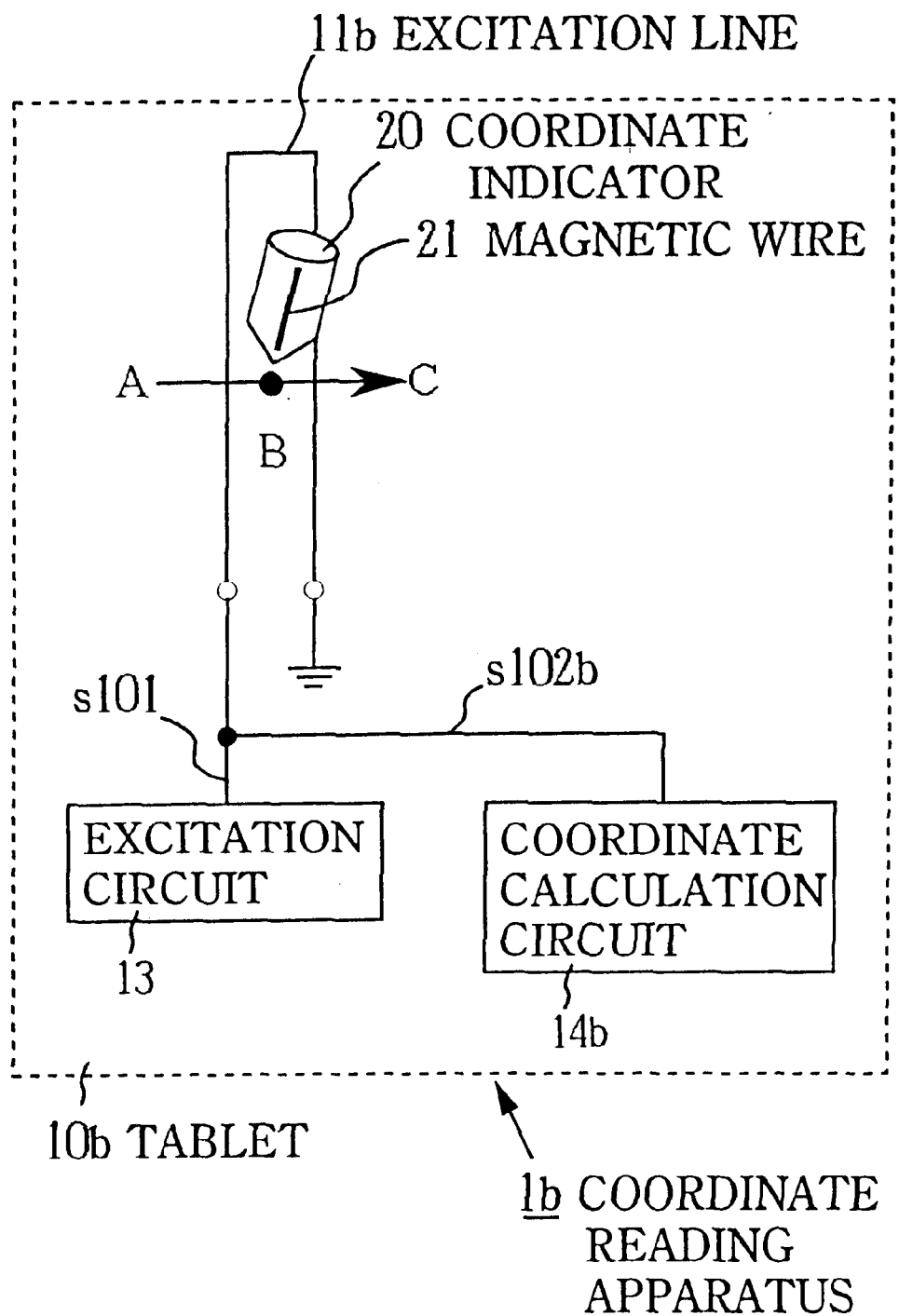
FIG. 9 is a schematic block diagram for representing a coordinate reading apparatus according to a third embodiment of the present invention.

FIG. 9 is a schematic block diagram for indicating the coordinate reading apparatus 1b of this third embodiment. As indicated in this drawing, an excitation line 11b is made of a rectangular-shaped coil similar to the second embodiment. The excitation circuit 13 for supplying the excitation signal s101 is connected to this excitation line 11b, and also to a coordinate calculation circuit 14b. An arrangement of the coordinate calculation circuit 14b may be made substantially identical to that of the first embodiment. It should be noted that the arrangements of the excitation circuit 13 and the coordinate indicator 20 are made identical to those of the first embodiment.

Operations of this coordinate reading apparatus 1b will now be described. Also in this third embodiment, when the excitation signal s101 is supplied from the excitation circuit 13 to the excitation line 11b, this excitation line 11b produces an AC magnetic field. In response to this AC magnetic field, the magnetic wire 21 of the coordinate indicator 20 produces a magnetic pulse caused by the Large Barkhausen effect. This above-explained operation is the same as in the above-mentioned embodiment.

This third embodiment owns the following different operation from that of the above-explained embodiment. That is, the magnetic pulse generated from the magnetic wire is coupled to the excitation line 11b, and then the coordinate position is calculated by employing the induced signal which is induced to the excitation line 11b. A signal s102b made by synthesizing the excitation signal s101 with the induced signal caused by the magnetic pulse is entered into a coordinate calculation circuit 14b. This synthesized signal has the same signal component as that of the induced signal s102 in the first embodiment. In other words, as indicated in FIG. 5B, this synthesized signal s102b is such a signal made by adding the induced signal component by the magnetic pulse to the induced signal which is induced by the excitation signal s101 (it should be noted that since there is a phase shift between excitation signal and induced signal, a synthesized waveform is not equal to that of FIG. 5). As a result, when this signal is separated by the filter circuit 142 to extract only the signal component made by the magnetic pulse, the coordinate reading apparatus 1b according to the third embodiment can calculate the position of the coordinate indicator from this signal in a similar manner to the first embodiment.

(Fourth Embodiment)

In the foregoing descriptions, the three embodiments have described the structural differences in the excitation line and the sense line as to the coordinate reading apparatuses made of the basic arrangements. These coordinate reading apparatuses are directed to the calculations of the coordinate values within the one-dimensional limited range. Next, a description will now be made of another embodiment of a more practical coordinate reading apparatus.

That is, a coordinate reading apparatus according to a fourth embodiment of the present invention is arranged by rearranging the structure of the coordinate reading apparatus according to the second embodiment so as to be capable of calculating a coordinate within a two-dimensional wide range. Referring now to FIG. 10 to FIG. 14, the coordinate reading apparatus of this fourth embodiment will be explained.

Figure 10:
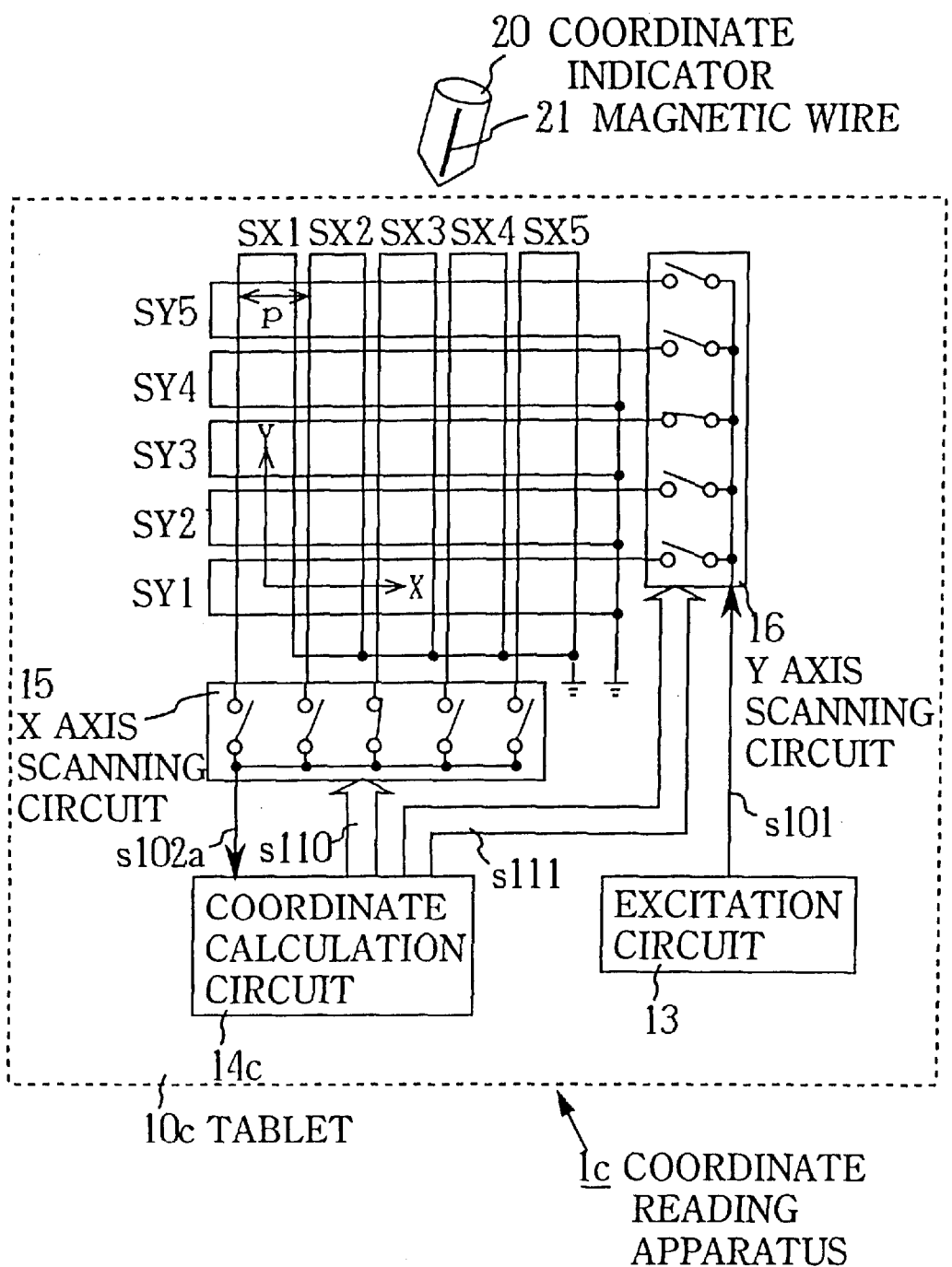
FIG. 10 is a schematic block diagram for indicating an arrangement of a coordinate reading apparatus according to a fourth embodiment of the present invention.
Figure 11:
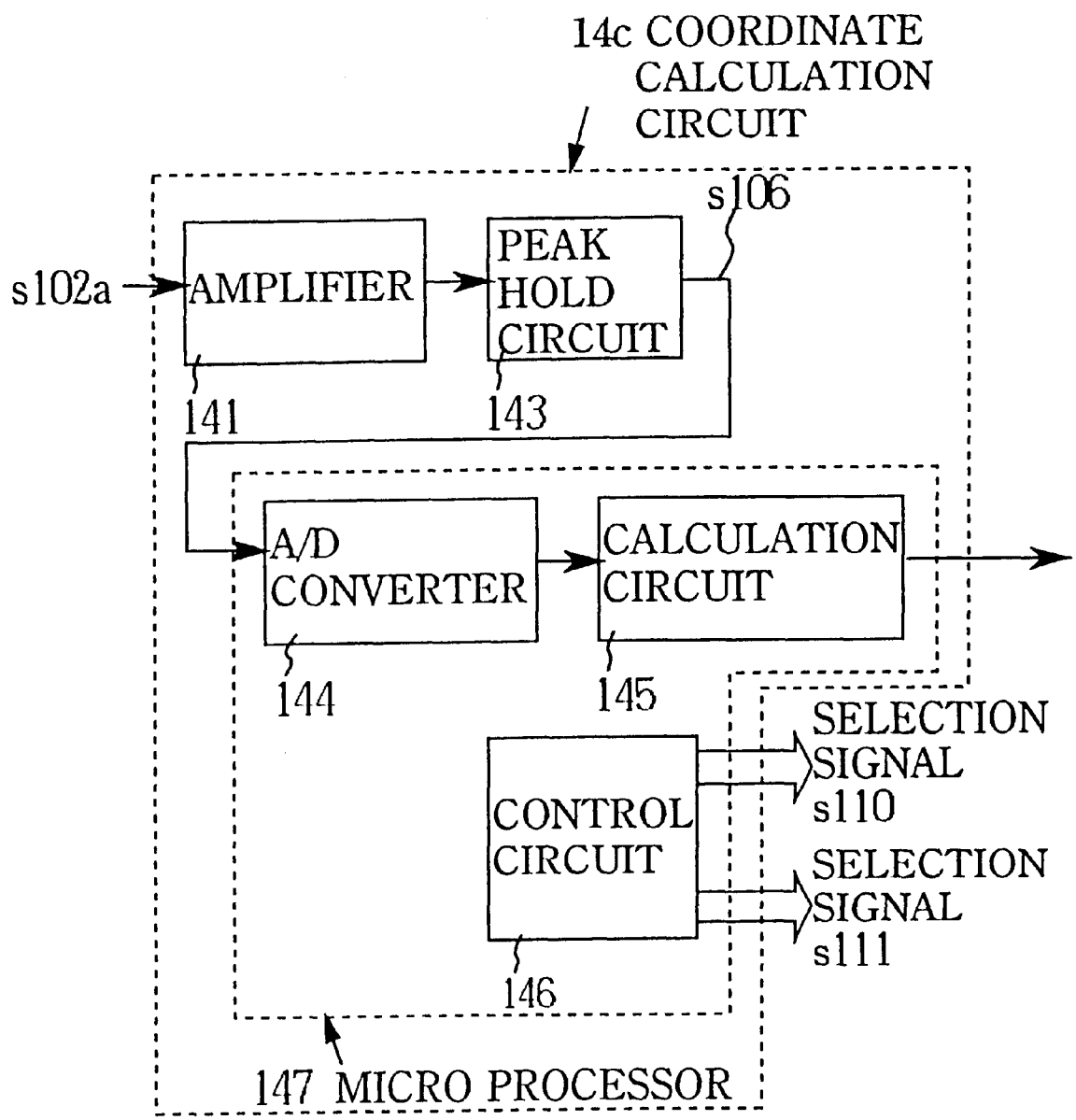
FIG. 11 is a schematic block diagram of the coordinate calculation circuit employed in the coordinate reading apparatus of the fourth embodiment.
Figure 12:
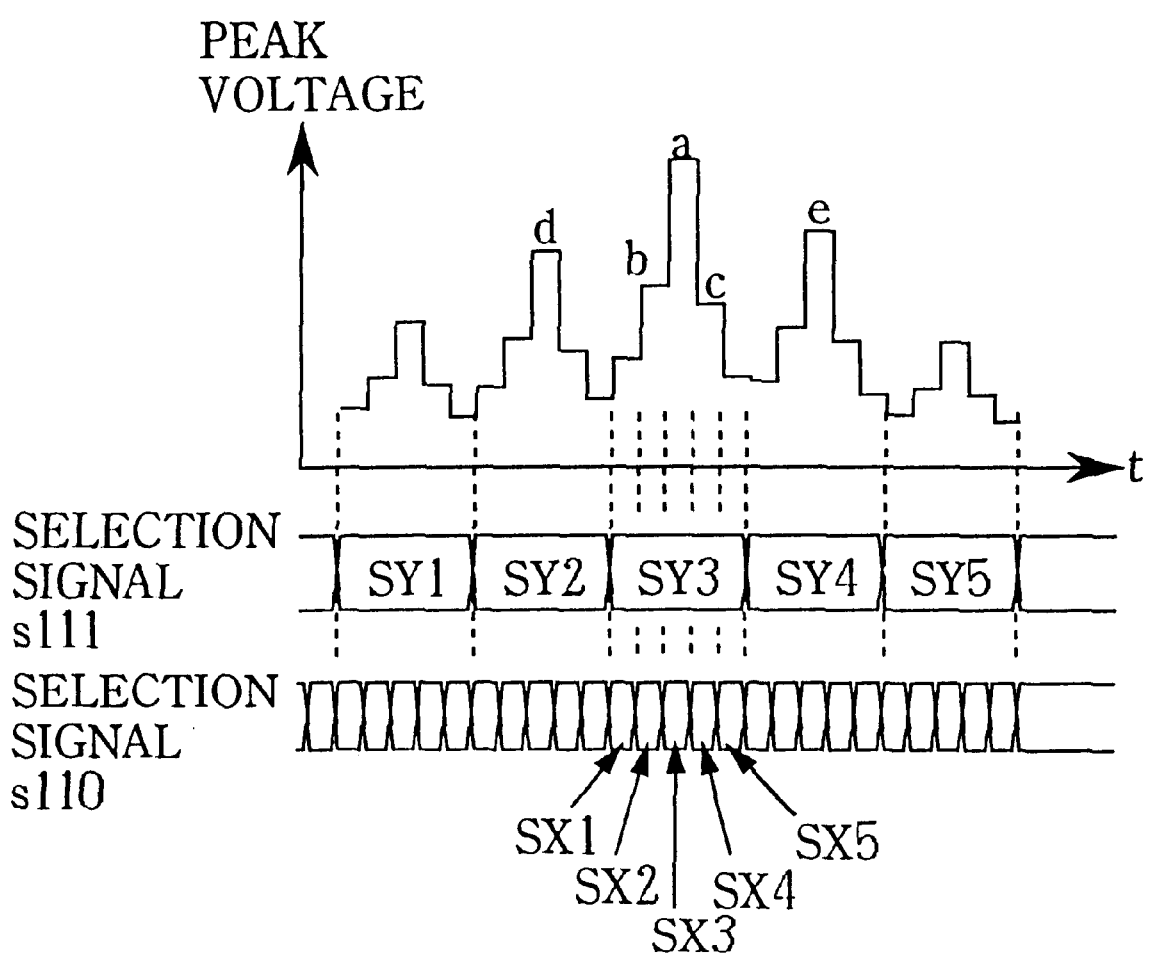
FIG. 12 is an explanatory diagram for explaining a distribution condition of peak voltages in the fourth embodiment.
Figure 14:
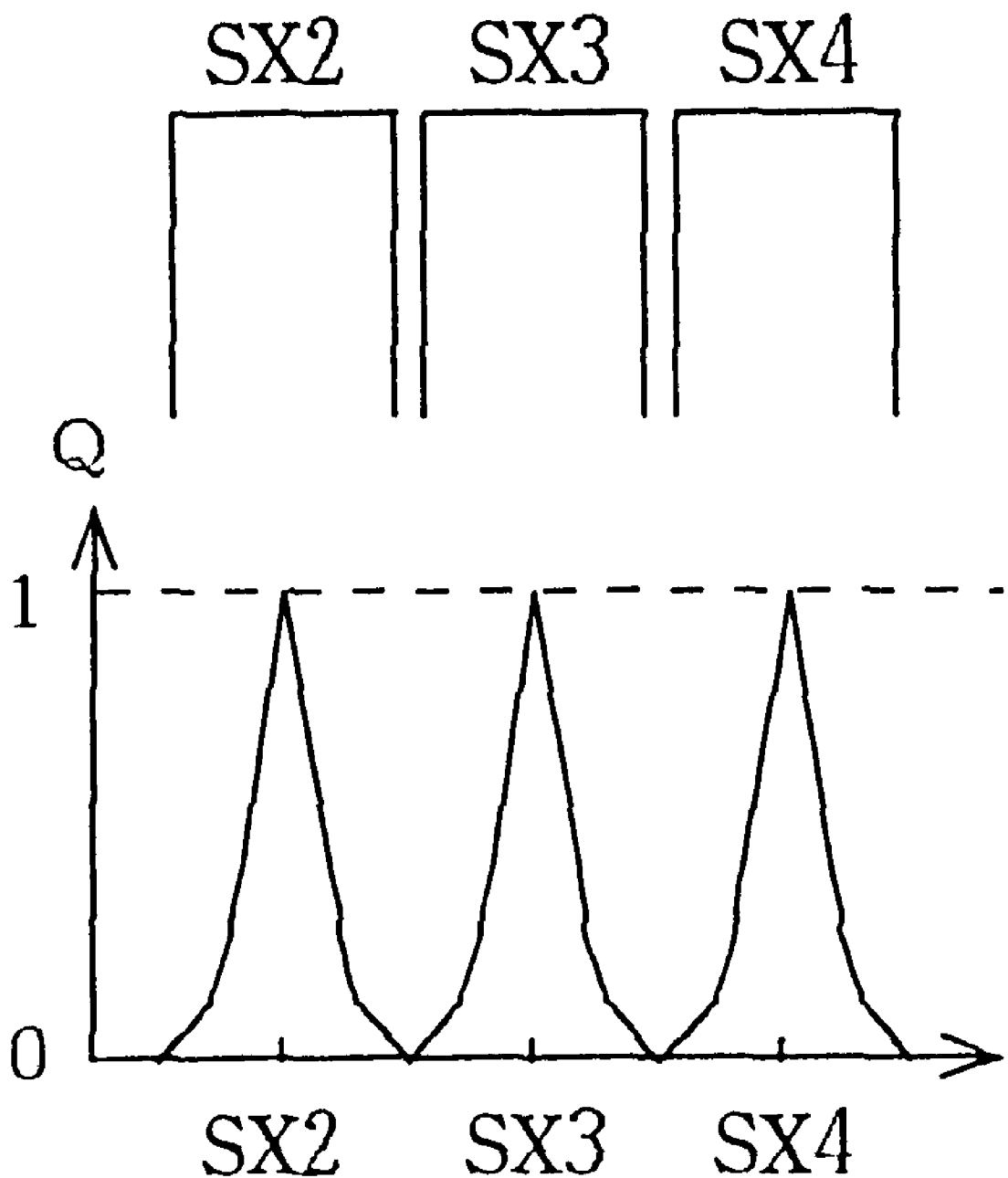
FIG. 14 is an explanatory diagram for explaining a relationship between a coordinate calculating variable and a position of a magnetic wire in the fourth embodiment.

FIG. 10 is a schematic block diagram for representing the coordinate reading apparatus according to this embodiment. FIG. 11 is a schematic block diagram for indicating a detailed circuit arrangement of the coordinate calculation circuit. FIG. 12 is an explanatory diagram for explaining a distribution condition of a peak voltage used in the coordinate calculation. FIG. 13 is an explanatory diagram for explaining a relationship between a position of a magnetic wire and the peak voltage used in the coordinate calculation. FIG. 14 is an explanatory diagram for explaining a relationship between the position of the magnetic wire and a coordinate calculating variable.

First, the arrangement of this coordinate reading apparatus 1c will be explained with reference to FIG. 10. As indicated in FIG. 10, the coordinate reading apparatus 1c is equipped with a tablet 10c and a coordinate indicator 20. The coordinate indicator 20 has the same circuit arrangement as that of the above-described embodiment, and contains a magnetic wire 21.

On a coordinate reading plane of this tablet 10c, excitation lines SY1, - - -, SY5 are arranged along a Y direction, and further sense lines SX1, - - -, SX5 are arranged along an X direction perpendicular to the Y direction. These lines are arranged in such a manner that, for instance, conducting lines having rectangular loop shapes are provided on a printed board, and the excitation lines SY1, - - -, SY5 are arranged in an equi-interval, and the sense lines SX1, - - -, SX5 are arranged in an equi-interval, while maintaining an arranging pitch "p". In FIG. 10, 5 sets of excitation lines and 5 sets of sense lines are provided. Alternatively, a total number of these excitation/sense lines may be properly selected so as to be fitted to the coordinate reading range. All of one terminal of each of these excitation lines SY1, - - -, SY5, and one terminals of these sense lines SX1, - - -, SX5 are grounded. All of the other terminals of these excitation lines SY1, - - -, SY5 are connected to a Y-axis scanning circuit 16. Similarly, all of the other terminals of these sense lines SX1, - - -, SX5 are connected to an X-axis scanning circuit 15. As will be explained later, the excitation lines SY1, - - -, SY5 produce an AC magnetic field in response to the excitation signal s101. The sense lines SX1, - - -, SX5 induce an induced signal s102a by being coupled with the coordinate indicator 20.

Both the X-axis scanning circuit 15 and the Y-axis scanning circuit 16 are a plurality of electronic switch elements such as analog switches. One terminal of the respective switch elements are connected to each other to thereby constitute a common terminal. These scanning circuits 15 and 16 are also connected to the coordinate calculating circuit 14c. When a selection signal s110 and another selection signal s111 are applied from the coordinate calculation circuit 14c to these electronic switch elements, one of these switch elements is closed, and one terminal of this closed switch element is connected to the common terminal. To the respective terminals of the X-axis/Y-axis scanning circuits, the above-explained excitation lines SY1, - - -, SY5, and the above-mentioned sense lines SX1, - - -, SX5 are connected. Also, the common terminal of the Y-axis scanning circuit 16 is connected to the excitation circuit 13, and the common terminal of the X-axis scanning circuit 15 is connected to the coordinate calculation circuit 14c.

The excitation circuit 13 supplies the excitation signal s101 to the excitation line selected by the Y-axis scanning circuit 16, and contains an oscillator and a drive circuit, similar to the previous embodiment, although not shown in this drawing.

The coordinate calculation circuit 14c is connected to the X-axis scanning circuit 15. In FIG. 11, there is shown an internal circuit arrangement of this coordinate calculation circuit 14c. As indicated in this drawing, the coordinate calculation circuit 14c is constituted by an amplifier circuit 141, a peak hold circuit 143, an A/D converter 144, a calculation circuit 145, and a control circuit 146. In this internal circuit arrangement, the structures defined from the amplifier circuit 141 to the calculation circuit 145 are identical to those of the second embodiment. The control circuit 146 supplies the selection signals s110 and s111 to the X-axis scanning circuit 15 and the Y-axis scanning circuit 16, and further controls other circuits so as to execute the coordinate reading operation. The control circuit 146 may be realized as a portion of functions of a microprocessor 147 which this control circuit 146, the A/D converter 144, and the calculation circuit 145.

Subsequently, operations of the coordinate reading apparatus with the above-described arrangement will now be explained. As previously described in the second embodiment, in such a case that as indicated in FIG. 6, one of the excitation lines and one of the sense lines are selected by the X-axis scanning circuit 15 and the Y-axis scanning circuit 16, and the coordinate indicator 20 is moved, a relationship between a position of this moved coordinate indicator 20 and a peak voltage of an induced signal caused by the Large Barkhausen effect represents such a trend as shown in FIG. 4.

In accordance with this fourth embodiment, while a plurality of excitation lines and also of sense lines are sequentially selected, the peak voltages caused by the Large Barkhausen effect are monitored. Referring now to FIG. 12, a description will be made of a distribution of peak voltages when the excitation lines SY1, - - - , SY5, and the sense lines SX1, - - - , SX5 are sequentially scanned.

The coordinate calculation circuit 14c performs the scanning operation as follows: That is, this coordinate calculation circuit 14c supplies the selection signal s111 to the Y-axis scanning circuit 16 so as to select the excitation line SY1. Under this condition, the coordinate calculation circuit 14c supplies another selection signal s110 to the X-axis scanning circuit 15 in order to sequentially select the plural sense lines in this order of SX1, SX2, SX3, SX4, and SX5. When the sense line SX5 is selected, the coordinate calculation circuit 14c subsequently selects the excitation line SY2, and similarly selects the sense lines in the same order of SX1, - - - , SX5. A series of this scanning operation is carried out until the excitation line SY5. When the selecting operation of the excitation line SY5 and the sense line SX5 is accomplished, one scanning operation is ended. Then, returning back to the excitation line SY1, a similar scanning process operation is repeatedly carried out.

FIG. 12 graphically represents magnitudes of peak voltage induced to the sense lines SX1, - - - , SX5 under scanning condition. This graphic representation shows such a condition that the magnetic wire 21 is located in an intersect region between the excitation line SY3 and the sense line SX3. Under this condition, when both the excitation line SY3 and the sense line SX3 are selected, a maximum peak voltage "a" is produced. Along the X direction, peak voltages "b" and "c" having a second magnitude and a third magnitude are produced on the sense lines SX2 and SX4 located adjacent to the sense line SX3. Along the Y direction, peak voltages "d" and "e" having a third magnitude and a second magnitude are produced on the excitation lines SY2 and SY4 located adjacent to the excitation line SY3. As previously explained, a magnitude relationship between the peak voltages may be determined based on the distance between the intersecting region for the selected excitation line and the selected sense line, and the magnetic wire 21.

The peak voltage produced during the scanning operation is converted into the digital value in the coordinate calculation circuit 14c, and then this digital value is calculated in accordance with the program of the microprocessor. As explained above, the method for monitoring the signals induced to the sense line by scanning these signals, and for calculating the positions based on the magnitudes thereof may be realized by using the method disclosed in the conventional coordinate reading apparatus. Now, this coordinate calculating method will be explained.

The coordinate calculation circuit 14c detects a maximum peak voltage and peak voltages of sense lines located adjacent to the sense line from which this maximum peak voltages are produced, from the peak voltages sequentially entered thereinto in connection with the scanning operation. As to the peak voltages, the following symbols are given:

Vp=maximum peak voltage,

Vph=second peak voltage of sense line located adjacent to the sense line at which the maximum peak voltage is produced, Vpl=third peak voltage of sense line located adjacent to the sense line at which maximum peak voltage is produced.

As to the sense line from which the maximum peak voltage is produced, the number of this sense line is stored. This is called a coarse address, and this coarse address is expressed by "Cadrs". The coarse address indicates an approximate setting position of the coordinate indicator 20.

A more precise position may be calculated by calculating the above-described peak voltages. To this end, the following value "Q" is first calculated:

$$Q=(Vp-Vph)/(Vp-Vpl) \tag{1}$$

This value "Q" has the below-mentioned characteristics. As indicated in FIG. 13A, the magnetic wire 21 is located at a center point "P" of the sense line SX3. When the sense line SX3 is selected under this condition, as previously explained, a maximum peak voltage is generated on this sense line SX3. The coordinate calculation circuit 14c stores this peak voltage information Vp and the sense line position at this time. For the sake of easy calculation, the sense line position is stored in the form of a number. In this example, while the reference sense line is set as "SX1", the sense line number is set as "0". As a consequence, in this case, Cadrs=2 is stored. As indicated in FIG. 13B, when the sense line SX2 is selected, a peak voltage lower than the maximum peak voltage Vp is induced to this sense line SX2, and the third peak voltage Vpl is inputted to the coordinate calculation circuit 14c. Also, when the sense line SX4 is selected, the second peak voltage Vph is entered to the coordinate calculation circuit 14c. In the case that the magnetic wire 21 is positioned at the point "P", the electromagnetic induction effect for inducing the magnetic pulse from the magnetic wire 21 in the sense line SX2 is equal to that in the sense line SX4. Accordingly, as indicated in FIG. 13B, since Vph=Vpl, the value "Q" is given by formula (1) as follows:

Q=1.

Next, as represented in FIG. 13C, when the magnetic wire 21 is moved along the X direction to be located at a point Q, the peak voltages induced to the sense lines SX2 and SX3 are decreased. Conversely, the peak voltage induced to the sense line SX4 is increased. As a result, as indicated in FIG. 13D, the maximum voltage Vp and the third peak voltage Vpl are decreased, and the second peak voltage Vph is increased, so that the value Q of formula (1) becomes a value smaller than 1.

When the magnetic wire 21 is further moved to be located at another position "R" of FIG. 13E, namely this magnetic wire 21 is moved from the position shown in FIG. 13A by a half of the sense line pitch "p", the value "Q" of formula (1) becomes a minimum value. At this time, as indicated in FIG. 13F, the peak voltage induced to the sense line SX3 is equal to the peak voltage induced to the sense line SX4, so that Vp=Vph, and Q=0 from formula (1).

Similar to the above-described case, when the magnetic wire 21 is moved from the center position "P" shown in FIG. 13A in the left direction, the value Q is calculated based on formula (1). Also, in this left movement case, the increase/decrease trend of this value Q represents the same as the above-explained trend. As apparent from the foregoing descriptions, the value Q may have the values between "1" and "0" with respect to a half pitch of the sense line pitch "p", as indicated in FIG. 14. Thus, the value Q corresponds to precise positions among the sense lines in a one-to-one relationship. If this Q-value characteristic is previously acquired by experiment, then the value Q is calculated from the amplitude information about the peak voltage, and therefore the precise position among the sense lines can be acquired.

An indication position where the magnetic wire 21 is located may be acquired by adding/subtracting the approximate position defined by the above-described coarse address to/from the precise position acquired in this condition. The position calculation formulae (2) and (3) are given as follows:

$$\text{Indication position} = \text{Cadrs}*p + f(Q) \quad (2),$$

where the second peak voltage Vph is located on the right side of the maximum peak voltage Vp.

$$\text{Indication position} = \text{Cadrs}*p - f(Q) \quad (3),$$

where the second peak voltage Vph is located on the left side of the maximum peak voltage Vp.

Now, symbols will be again explained:

Cadrs: coarse address, p: arranging pitch of sense line, f(Q): precise position among sense lines, corresponding to value Q. As previously explained, the position indicated by the coordinate indicator 20 is calculated based on these formulae.

(Fifth and Sixth Embodiments)

The coordinate reading apparatus of the fourth embodiment is made by rearranging the structure of the coordinate reading apparatus of the second embodiment to realize the two-dimensional coordinate reading structure. Similarly, the one-dimensional coordinate reading structure of either the first embodiment or the third embodiment may be rearranged to realize a coordinate reading apparatus with a two-dimensional coordinate reading structure.

Figure 15:
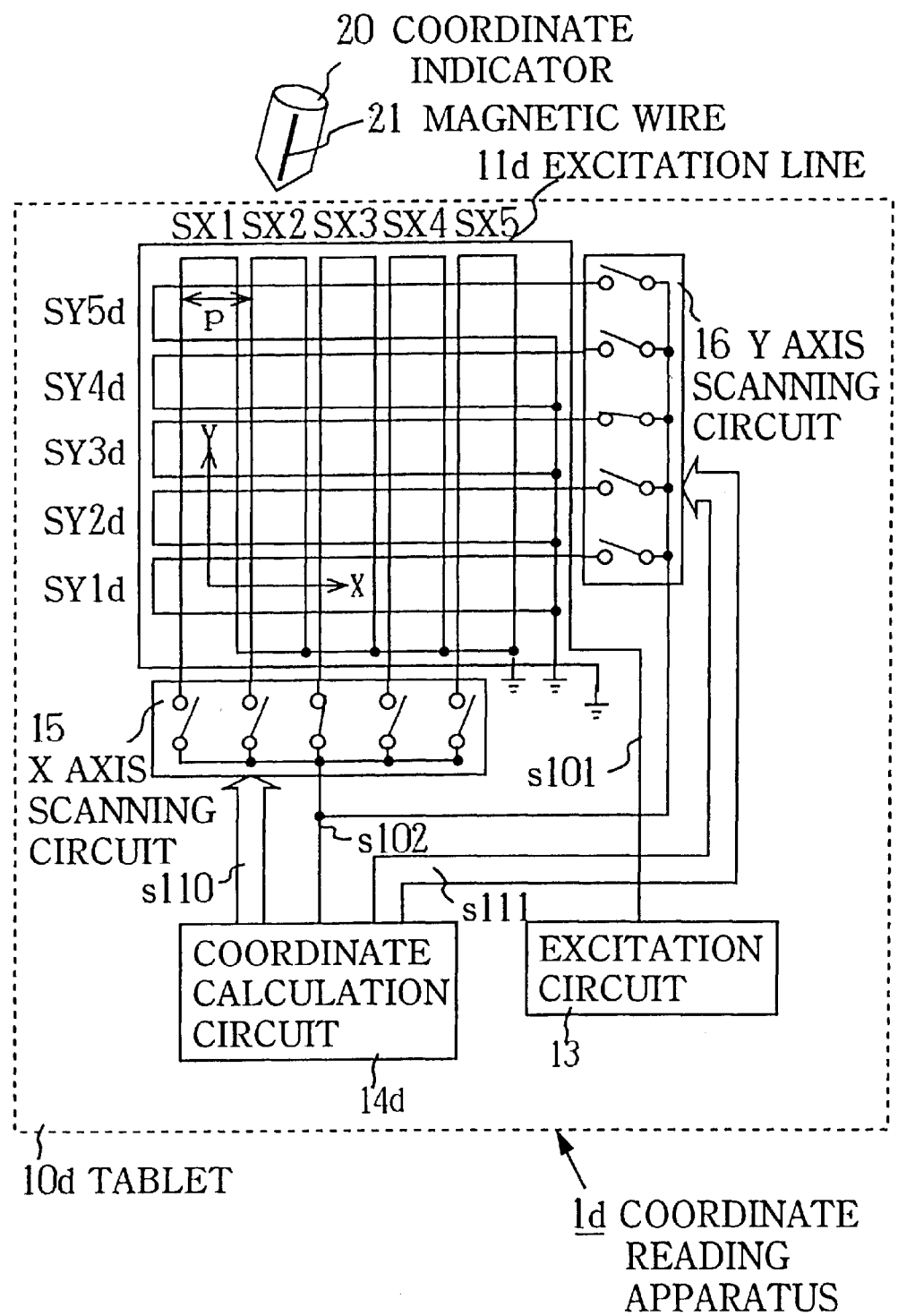
FIG. 15 is a schematic block diagram for representing a coordinate reading apparatus according to a fifth embodiment of the present invention.

First, FIG. 15 is a schematic block diagram for showing a coordinate reading apparatus 1d, according to a fifth embodiment, having a coordinate reading structure rearranged based on that of the first embodiment. In this fifth embodiment, the lines along the Y direction, which function as the excitation lines in the fourth embodiment, correspond to sense lines SY1d, - - - , SY5d. These sense lines are connected to the Y-axis scanning circuit 16, and the common terminal line of this Y-axis scanning circuit 16 is connected to a coordinate calculation circuit 14d. A new excitation line 11d is provided around a position where the sense lines SX1, - - - , SX5 and SY1d, - - - , SY5d are arranged perpendicular to each other. This new excitation line 11d is connected to the excitation circuit 13. A major circuit portion of the coordinate calculation circuit 14d is identical to that of the first embodiment, and a control circuit for outputting the selection signals s110 and s111 is newly added thereto. The arrangements of the excitation circuit 13 and the coordinate indicator 20 are the same as those of the above-explained embodiment.

In the coordinate reading apparatus with the above-explained arrangement, an induced signal which is induced to a single sense line is identical to that of the first embodiment. A signal component produced by the Large Barkhausen effect is separated by the filter circuit of the coordinate calculation circuit 14d, and is used to calculate the coordinate value. Also, since a two-dimensional distribution of this signal is the same as in the fourth embodiment, the sense lines are scanned in a similar manner to the fourth embodiment, so as to monitor this signal, and the monitored peak voltage is calculated, so that the coordinate value of the position indicated by the coordinate indicator is calculated.

Figure 16:
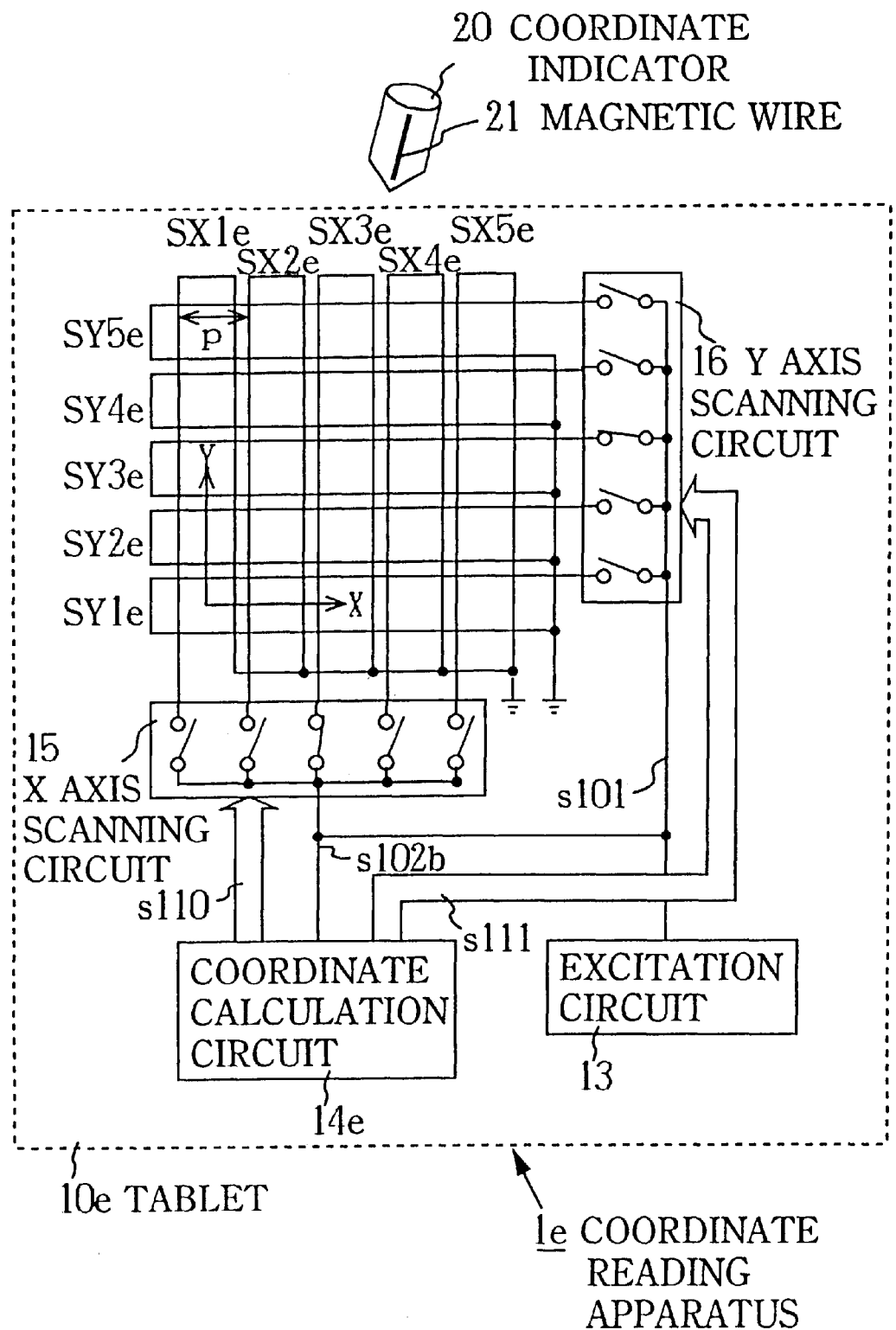
FIG. 16 is a schematic block diagram for representing a coordinate reading apparatus according to a sixth embodiment of the present invention.

Similarly, FIG. 16 is a schematic block diagram for indicating a coordinate reading apparatus according to a sixth embodiment, the arrangement of which is realized by rearranging the arrangement of the coordinate reading apparatus according to the third embodiment. In this sixth embodiment, both a common terminal of the X-axis scanning circuit 15 and a common terminal of the Y-axis scanning circuit 16 are connected to both a coordinate calculation circuit 14e and the excitation circuit 13. It should be understood that sense lines SX1e, - - - , SX5e and SY1e, - - - , SY5e arranged on a tablet 10e may function as excitation lines and also sense lines. A major circuit portion of a coordinate calculation circuit 14e is identical to that of the third embodiment, and a control circuit for outputting the selection signals s110 and s111 is newly added thereto. The arrangements of the excitation circuit 13 and the coordinate indicator 20 are the same as those of the above-explained embodiment.

In the coordinate reading apparatus with the above-explained arrangement, an induced signal which is induced to a single sense line is identical to that of the third embodiment. Also, since a two-dimensional distribution of this signal is the same as in the fourth embodiment, the coordinate value of the position indicated by the coordinate indicator can be calculated in a similar manner to that of the fourth embodiment.

(Other Embodiments)

As previously explained, according to the present invention, the coordinate reading apparatuses can be constituted by employing various arrangements. Alternatively, the above-described structural elements may be realized by using other structural elements.

Figure 17A:
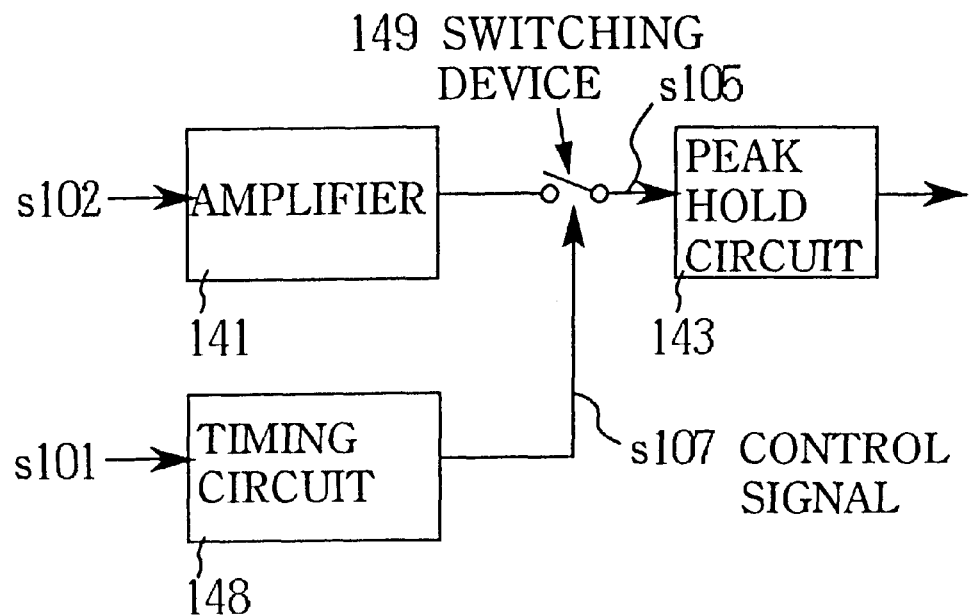
FIG. 17 is a schematic block diagram for showing a filter circuit of a coordinate reading apparatus according to another embodiment of the present invention, and a timing chart thereof.

For instance, the filter circuit 142 of the coordinate calculation circuit 14 shown in FIG. 2 has been constructed of the frequency filter. Alternatively, this frequency filter may be substituted by a filter for temporally switching a signal by using the feature of the magnetic pulse produced by the Large Barkhausen effect. FIG. 17A is a schematic block diagram for showing such a filter circuit and a peripheral circuit thereof. In this drawing, a switching device 149 is connected between the amplifier circuit 141 and the peak hold circuit 143. This switching device corresponds to an electronic switch turned ON/OFF in response to a control signal s107. A timing circuit 148 is newly employed, to which the excitation signal s101 is inputted. This timing circuit 148 produces the control signal s107 based on this entered excitation signal s101, and this control signal s107 causes the switching device 149 to be turned ON/OFF.

Figure 17B:
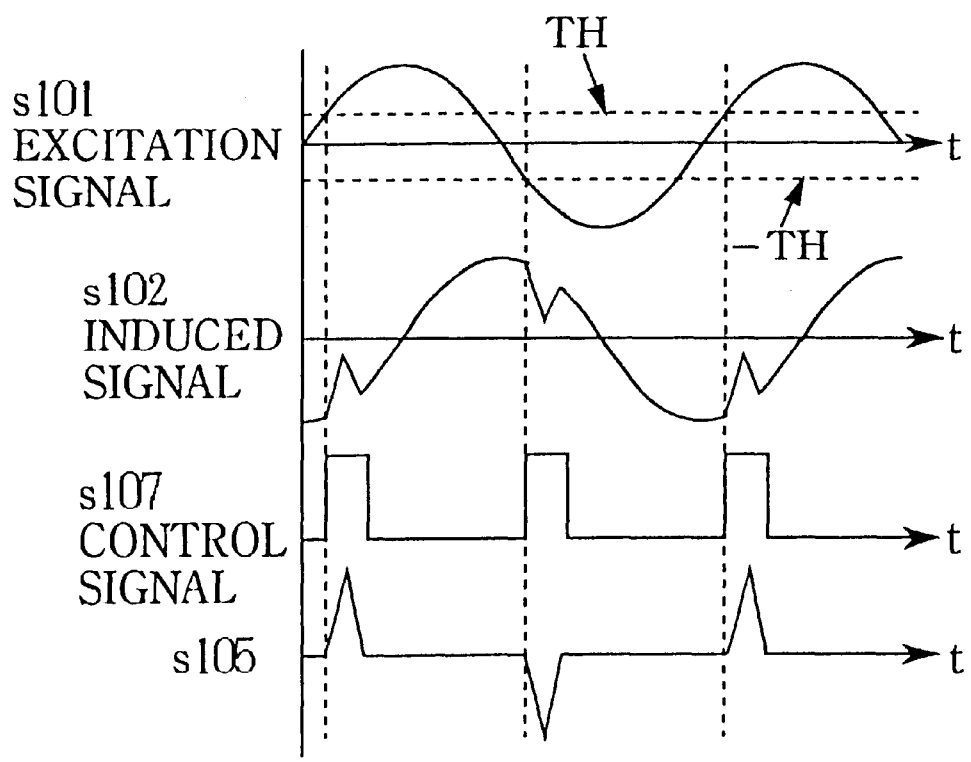

These circuits are operated as follows: As indicated in FIG. 17B, the induced signal s102 is such a signal produced by being added with the signal component caused by the Large Barkhausen effect approximately at such timing when the polarity of the excitation signal s101 is inverted. Precisely speaking, this induced signal s102 is produced when the polarity of the magnetic field applied to the magnetic wire is inverted, and the magnetic field having the reverse polarity exceeds the threshold value specific to the magnetic wire. As a consequence, the timing circuit 148 enters thereinto the excitation signal s101, and detects the polarity inversion of this excitation signal s101. Thereafter, the timing circuit 148 detects that the magnetic field having the inverted polarity exceeds either a threshold value "TH" or another threshold value "−TH", and produces the control signal s107 which is turned ON for a predetermined time period after being detected. The switching device 149 is operated in such a manner that when the control signal s107 is ON, the circuit is closed, whereas when the control signal s107 is OFF, the circuit is opened. As a consequence, the switching device 149 connects the output of the amplifier circuit 141 to the peak hold circuit 143 in synchronism with the polarity inverting timing of the excitation signal s101. As a result of this switching operation, only the signal component s105 caused by the Large Barkhausen effect is inputted to the peak hold circuit 143.

Figure 18:
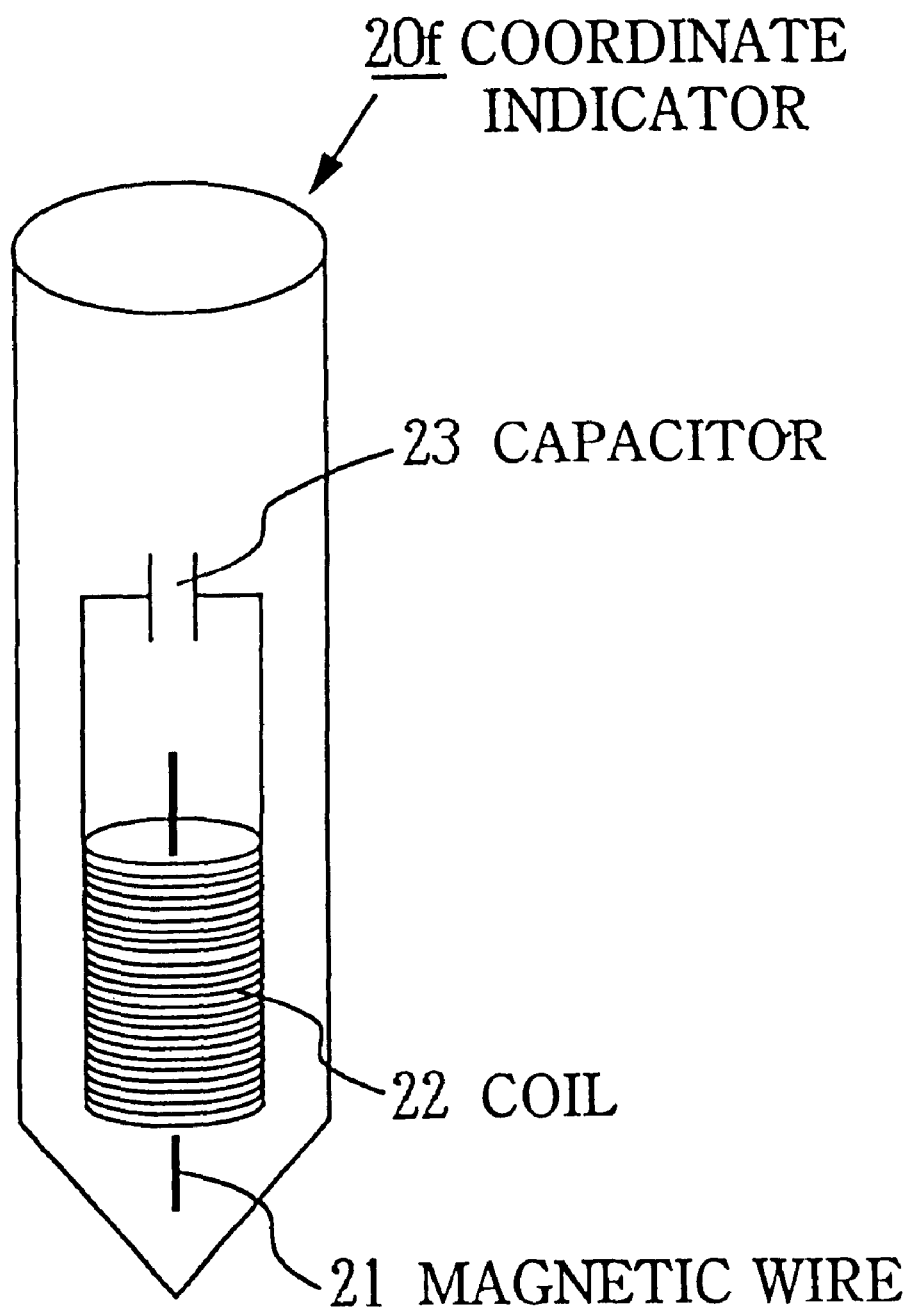
FIG. 18 is an explanatory diagram for explaining a structure of a coordinate indicator of a coordinate reading apparatus according to another embodiment of the present invention.

Next, a description will now be made of such an arrangement capable of increasing the coupling sensitivity between the tablet and the coordinate indicator. The Large Barkhausen effect occurs when a magnetic material is exposed to a magnetic field having a preselected strength. This Large Barkhausen effect does not occur in a magnetic field having a field strength lower than, or equal to the boundary field strength. Accordingly, the magnetic field having the field strength required to cause a magnetic wire to produce the Large Barkhausen effect is generated from an excitation coil. In view of a circuit scale as well as power consumption of an excitation circuit, it is desirable to lower an excitation signal. FIG. 18 schematically shows a structure of a coordinate indicator capable of achieving the above-described purpose.

A resonant circuit formed by connecting a coil 22 to a capacitor 23 is provided with a coordinate indicator 20f. Then, a magnetic wire 21 is arranged inside this coil 22. The resonant frequency of this resonant circuit is set to be equal to the frequency of the excitation signal.

In the coordinate indicator 20f with this structure, the resonant circuit is coupled with the excitation signal to thereby store therein energy, and thus the coil 22 itself produces a magnetic field. As a consequence, such a magnetic field having a field strength higher than that of the solo magnetic wire is applied to the magnetic wire 21 arranged inside this coordinate indicator. As a consequence, the magnetic field generated from the excitation line can be weakened, as compared with such a case that the coordinator indicator with employment of only the magnetic wire is used, and also the output from the excitation circuit can be lowered.

In the coordinate reading apparatus according to the present invention, the Large Barkhausen effect is utilized, and the magnetic material called as the Wiegand wire has been employed as one example of the magnetic material capable of producing this Large Barkhausen effect in the above-described embodiment. However, since various sorts of magnetic materials whose characteristics are improved in order to produce the Large Barkhausen effect are proposed, these magnetic materials may be utilized.

For example, a ribbon made of an amorphous metal is commercially available, and therefore this amorphous ribbon may be used. Also, it is known that amorphous metal fiber among the amorphous metals particularly represents the Large Barkhausen effect under its spinning condition. This amorphous metal fiber is continuously manufactured by such a manufacturing method called as the "Rotational fluid spinning method". Since this amorphous metal fiber owns such a feature that the inversion speed of the magnetization is very fast and becomes stable and further the threshold value of the magnetization inversion is small, if this amorphous metal fiber is applied to the coordinate reading apparatus according to the present invention, then there is a merit that the excitation signal can be reduced. This amorphous metal fiber is applied to shop burglar alarm devices, and is commercially available by Sensormatic Electronics Corporation U.S.A.

Also, the Large Barkhausen effect depends upon only the strength of the magnetic field applied to the magnetic wire, but does not depend upon the excitation frequency. As a consequence, in the above-explained first embodiment, the frequency of the excitation signal s101 may be arbitrarily selected in the low frequency range. For instance, when the excitation frequency is selected to be on the order of several tens of Hz, the signal component (namely, signal component s103 of FIG. 3) becomes a small signal, as compared with the signal component (namely, signal component s104 of FIG. 3) caused by the Large Barkhausen effect. In such a case, since both signals are no longer separated from each other, the filter circuit 142 of the coordinate calculation circuit 14 may be omitted. This may be similarly applied to the fifth embodiment.

Furthermore, since the typical circuit arrangements have been described in the above-explained embodiments, these typical circuit arrangements may be apparently replaced by other circuit arrangements having the same or similar functions. For example, in the above-explained embodiment, the peak of the signal caused by the Large Barkhausen effect is held by the peak hold circuit. This peak hold circuit is one of means for measuring the amplitude of the signal. When the excitation frequency is selected to be high, the signals caused by the Large Barkhausen effect are frequently produced. Therefore, in such a case, these signals may be alternatively converted into DC signals by employing an integration circuit.

As previously described in detail, in accordance with the present invention, the magnetic material employed in the coordinate indicator produces the magnetic pulse caused by the Large Barkhausen effect, and the tablet calculates the coordinate value based on the signal produced by this magnetic pulse. The magnitude of the signal received at this time is determined by the distance between the coordinate indicator and the magnetic generating means employed in the tablet. As a consequence, the coordinate value of the position indicated by the coordinate indicator can be calculated by calculating the amplitude of the reception signal by the tablet. Also, in this case, when a plurality of rectangular-shaped coils are arranged as the magnetic field generating means and then these plural coils are scanned/selected, the positional relationship between these plural coils and the coordinate indicator can be determined, so that the precise position of the coordinate indicator can be calculated in high resolution.

Also, according to the present invention, the large-sized component such as the coil need not be mounted on the coordinate indicator, but only the magnetic material is merely provided with the coordinate indicator. As a consequence, there are merits that the structure of this coordinate indicator can be made simple, and also the width of the pen shaft, or the pen tip need not be widened. Since the limitations to the outer shape of the coordinate indicator are mitigated, the easy-operable coordinate indicator can be designed.

What is claimed is:

1. A coordinate reading apparatus comprising: AC magnetic field generating means for generating an AC magnetic field; a coordinate indicator having a magnetic material for producing a magnetic pulse caused by the Large Barkhausen effect when the magnetic material is positioned in the magnetic field generated by the AC magnetic field generating means; magnetic field detecting means for detecting the magnetic pulse caused by the Large Barkhausen effect; and coordinate calculating means connected to the magnetic field detecting means for calculating a position indicated by the coordinate indicator in response to a signal produced based upon the magnetic pulse detected by the magnetic field detecting means.

2. In a coordinate reading apparatus comprising a coordinate indicator and a tablet, for calculating and outputting a coordinate value of a position on a tablet indicated by the coordinate indicator: wherein the coordinate indicator contains a magnetic material for producing a magnetic pulse caused by the Large Barkhausen effect when the magnetic material is positioned in a magnetic field generated by the tablet; and the tablet comprises an excitation circuit for producing an AC excitation signal; an excitation line connected to the excitation circuit, for generating an AC magnetic field in response to the excitation signal; a sense line for detecting the magnetic pulse caused by the Large Barkhausen effect; and a coordinate calculation circuit connected to the sense line for calculating a position indicated by the coordinate indicator in response to a signal produced based upon the magnetic pulse detected by the sense line.

3. In a coordinate reading apparatus comprising a coordinate indicator and a tablet, for calculating and outputting a coordinate value of a position on a tablet indicated by the coordinate indicator: wherein the coordinate indicator contains a magnetic material for producing a magnetic pulse caused by the Large Barkhausen effect when the magnetic material is positioned in a magnetic field generated by the tablet; and the tablet comprises an excitation circuit for producing an AC excitation signal; an excitation line connected to the excitation circuit, for generating an AC magnetic field in response to the excitation signal, the excitation line comprising a coil wound in a substantially rectangular shape; a sense line for detecting the magnetic pulse caused by the Large Barkhausen effect, the sense line comprising a coil wound in a substantially rectangular shape and being arranged perpendicular to the excitation line along a longitudinal direction of the rectangular shape; and a coordinate calculation circuit connected to the sense line for calculating a position indicated by the coordinate indicator in response to a signal produced based upon the magnetic pulse detected by the sense line.

4. In a coordinate reading apparatus comprising a coordinate indicator and a tablet, for calculating and outputting a coordinate value of a position on a tablet indicated by the coordinate indicator: wherein the coordinate indicator contains a magnetic material for producing a magnetic pulse caused by the Large Barkhausen effect when the magnetic material is positioned in a magnetic field generated by the tablet; and the tablet comprises an excitation circuit for producing an AC excitation signal; an excitation line connected to the excitation circuit, for generating an AC magnetic field in response to the excitation signal; a sense line group constructed of a plurality of sense lines for detecting the magnetic pulse caused by the Large Barkhausen effect, the plurality of sense lines comprising a plurality of coils wound in a substantially rectangular shape, a longitudinal direction of the rectangular shape being arranged along a direction perpendicular to a coordinate detecting coordinate axis, and the plural coils being arranged at equal intervals; a scanning circuit connected to the sense line group for selecting respective sense lines from the sense line group; and a coordinate calculation circuit connected to the scanning circuit for calculating a position indicated by the coordinate indicator in response to a signal produced based upon the magnetic pulse detected by the sense line group.

5. In a coordinate reading apparatus comprising a coordinate indicator and a tablet, for calculating and outputting a coordinate value of a position on a tablet indicated by the coordinate indicator, the improvement comprising:

wherein the coordinate indicator contains a magnetic material for producing a magnetic pulse caused by the Large Barkhausen effect when the magnetic material is positioned in a magnetic field generated by the tablet; and wherein the tablet comprises an excitation circuit for producing an AC excitation signal, an excitation line group constructed of a plurality of excitation lines for generating an AC magnetic field in response to the excitation signal, the plural excitation lines comprising a plurality of coils wound in a substantially rectangular shape, a longitudinal direction of the rectangular shape being arranged in parallel to one axis of the XY orthogonal coordinate axes, and the plural coils being arranged at equal intervals, a first scanning circuit connected to the excitation line group and the excitation circuit for selecting the excitation line group to be connected to the excitation circuit, a sense line group comprising a plurality of sense lines for detecting the magnetic pulse caused by the Large Barkhausen effect, the plural sense line comprising a plurality of coils wound in a substantially rectangular shape, a longitudinal direction of the rectangular shape being arranged in parallel to the other axis of the XY orthogonal coordinate axes, and the plural coils being arranged at equal intervals, a second scanning circuit connected to the sense line group for selecting the sense line group, and a coordinate calculation circuit connected to the second scanning circuit for calculating a position indicated by the coordinate indicator in response to a signal produced based upon the magnetic pulse detected by the sense line group.

6. A coordinate reading apparatus as claimed in any one of claims 2, 3, 4 and 5; wherein the coordinate calculation circuit comprises a filter circuit for passing only a signal component produced by the magnetic pulse; and a calculation circuit for calculating a position indicated by the coordinate indicator in response to the signal output by the filter circuit.

7. A coordinate reading apparatus according to claim 5; wherein the coordinate calculation circuit comprises a peak hold circuit for holding a peak value of the signal produced by the magnetic pulse, and a calculation circuit for calculating a position indicated by the coordinate indicator based upon the signal held by the peak hold circuit.

8. A coordinate reading apparatus as claimed in any one of claims 2, 3, 4 and 5; wherein the coordinate calculation circuit comprises a filter circuit for passing only a signal component produced by the magnetic pulse; a peak hold circuit for holding a peak value of the signal output from the filter circuit; and a calculation circuit for calculating a position indicated by the coordinate indicator in response to the signal held by the peak hold circuit.

9. A coordinate reading apparatus as claimed in any one of claims 2, 3, 4 and 5; wherein the coordinate calculation circuit comprises a filter circuit constructed by a switching circuit for causing a signal to pass therethrough for a predetermined time period during the time that the magnetic pulse is being generated in synchronism with the excitation signal; and a calculation circuit for calculating a position indicated by the coordinate indicator in response to the signal output from the filter circuit.

10. A coordinate reading apparatus as claimed in any one of claims 2, 3, 4, and 5; wherein the coordinate calculation circuit comprises a filter circuit constructed by a switching circuit for causing a signal to pass therethrough for a predetermined time period during the time that the magnetic pulse is being generated in synchronism with the excitation signal; a peak hold circuit for holding a peak value of the signal output from the filter circuit; and a calculation circuit for calculating a position indicated by the coordinate indicator in response to the signal held by the peak hold circuit.

11. A coordinate reading apparatus according to claim 5; wherein the coordinate indicator comprises a resonant circuit having a resonant frequency nearly equal to a frequency of the excitation signal; and wherein the magnetic material is arranged within a coil for constituting said resonant circuit.

12. In a coordinate indicator of a coordinate reading apparatus comprising a coordinate indicator and a tablet, for calculating and outputting a coordinate value of a position on a tablet indicated by the coordinate indicator, the improvement comprising: wherein the coordinate indicator contains a magnetic material for producing a magnetic pulse caused by the Large Barkhausen effect when the magnetic material is positioned in a magnetic field generated by the tablet.

13. In a coordinate indicator of a coordinate reading apparatus comprising a coordinate indicator and a tablet, for calculating and outputting a coordinate value of a position on a tablet indicated by the coordinate indicator, the improvement comprising: wherein the coordinate indicator comprises a resonant circuit having a resonant frequency nearly equal to a frequency of an AC magnetic field generated by the tablet, the resonant circuit comprising a magnetic material arranged in a coil for generating a magnetic pulse caused by the Large Barkhausen effect when the magnetic material is positioned in the AC magnetic field.

14. In a coordinate reading apparatus comprising a coordinate indicator and a tablet, for determining a coordinate value of a position on a tablet indicated by the coordinate indicator: wherein the coordinate indicator contains a magnetic material for producing a magnetic pulse caused by the Large Barkhausen effect when the magnetic material is positioned in a magnetic field generated by the tablet; and the tablet comprises an excitation circuit for producing an AC excitation signal; one or more magnetic lines for generating an AC magnetic field in response to the excitation signal and for detecting the magnetic pulse caused by the Large Barkhausen effect; and a coordinate calculation circuit for calculating a position indicated by the coordinate indicator in response to a signal produced based upon the magnetic pulse detected by the magnetic lines.

15. A coordinate reading apparatus according to claim 14; wherein the one or more magnetic lines comprise one or more sense lines for generating an AC magnetic field in response to the excitation signal, and for detecting the magnetic pulse caused by the Large Barkhausen effect.

16. A coordinate reading apparatus according to claim 14; wherein the one or more magnetic lines comprise one or more excitation lines connected to the excitation circuit for generating an AC magnetic field in response to the excitation signal and one or more sense lines for detecting the magnetic pulse caused by the Large Barkhausen effect.

17. A coordinate reading apparatus according to claim 16; wherein the one or more sense lines comprises a plurality of sense lines; and further comprising a scanning circuit connected to the sense lines for selecting respective ones of the sense lines.

18. A coordinate reading apparatus according to claim 17; wherein the one or more excitation lines comprises a plurality of excitation lines; and further comprising another scanning circuit connected to the excitation lines for selecting respective ones of the excitation lines; and wherein the coordinate calculation circuit controls the scanning circuits to select respective excitation lines and sense lines on a synchronous and sequential basis.

19. A coordinate reading apparatus according to claim 16; wherein the one or more excitation lines each comprise a coil wound in a substantially rectangular shape, and the one or more sense lines each comprise a coil wound in a substantially rectangular shape and being arranged perpendicular to the one or more excitation lines along a longitudinal direction of the rectangular shape.

20. A coordinate reading apparatus according to claim 16; wherein the coordinate calculation circuit comprises a filter circuit for passing only a signal component produced by the magnetic pulse; and a calculation circuit for calculating a position indicated by the coordinate indicator in response to the signal output by the filter circuit.

21. A coordinate reading apparatus according to claim 16; wherein the coordinate calculation circuit comprises a filter circuit for passing only a signal component produced by the magnetic pulse; a peak hold circuit for holding a peak value of the signal output from the filter circuit; and a calculation circuit for calculating a position indicated by the coordinate indicator in accordance with the signal held by the peak hold circuit.

22. A coordinate reading apparatus according to claim 16; wherein the coordinate calculation circuit comprises a filter circuit constructed of a switching circuit for causing a signal to pass therethrough for a predetermined time period during the time that the magnetic pulse is being generated in synchronism with the excitation signal; and a calculation circuit for calculating a position indicated by the coordinate indicator in accordance with the signal output by the filter circuit.

23. A coordinate reading apparatus according to claim 16; wherein the coordinate calculation circuit comprises a filter circuit constructed of a switching circuit for causing a signal to pass therethrough for a predetermined time period during the time that the magnetic pulse is being generated in synchronism with the excitation signal; a peak hold circuit for holding a peak value of the signal output from the filter circuit; and a calculation circuit for calculating a position indicated by the coordinate indicator in accordance with the signal held by the peak hold circuit.

24. A coordinate reading apparatus according to claim 14; wherein the coordinate indicator comprises a resonant circuit having a resonant frequency nearly equal to a frequency of the excitation signal, and the magnetic material is arranged within a coil of the resonant circuit.

25. A coordinate reading apparatus according to claim 14; wherein the coordinate indicator has a pen-shaped outer configuration.

26. A coordinate reading apparatus according to claim 14; wherein the one or more magnetic lines comprise an excitation line group constructed of a plurality of excitation lines for generating an AC magnetic field in response to the excitation signal, the plural excitation lines comprising a plurality of coils wound in a substantially rectangular shape, a longitudinal direction of the rectangular shape being arranged in parallel to one axis of the XY orthogonal coordinate axes, and a sense line group comprising a plurality of sense lines for detecting the magnetic pulse caused by the Large Barkhausen effect, the plural sense lines comprising a plurality of coils wound in a substantially rectangular shape, a longitudinal direction of the rectangular shape being arranged in parallel to the other axis of the XY orthogonal coordinate axes; and further comprising a first scanning circuit connected to the excitation line group and the excitation circuit for selecting respective excitation lines of the excitation line group to be connected to the excitation circuit, and a second scanning circuit connected to the sense line group for selecting respective sense lines of the sense line group; and wherein the coordinate calculation circuit is connected to the second scanning circuit for calculating a position indicated by the coordinate indicator in response to a signal produced based upon the magnetic pulse detected by the sense line group.

27. A coordinate reading apparatus according to claim 26; wherein the excitation lines are spaced from each other at equal intervals and the scanning lines are spaced from each other at equal intervals.

* * * * *